US011239930B2

United States Patent
Kazmi et al.

(10) Patent No.: US 11,239,930 B2
(45) Date of Patent: Feb. 1, 2022

(54) METHODS AND APPARATUS FOR ADAPTING SRS SWITCHING ACCOUNTING FOR MEASUREMENT PROCEDURE

(71) Applicant: Telefonaktiebolaget LM Ericsson (publ), Stockholm (SE)

(72) Inventors: Muhammad Kazmi, Sundbyberg (SE); Imadur Rahman, Sollentuna (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/340,334

(22) PCT Filed: Oct. 10, 2017

(86) PCT No.: PCT/EP2017/075799
§ 371 (c)(1),
(2) Date: Apr. 8, 2019

(87) PCT Pub. No.: WO2018/069311
PCT Pub. Date: Apr. 19, 2018

(65) Prior Publication Data
US 2019/0260487 A1     Aug. 22, 2019

Related U.S. Application Data

(60) Provisional application No. 62/406,818, filed on Oct. 11, 2016.

(51) Int. Cl.
*H04B 17/382*     (2015.01)
*H04L 5/00*     (2006.01)

(52) U.S. Cl.
CPC ......... *H04B 17/382* (2015.01); *H04L 5/0048* (2013.01)

(58) Field of Classification Search
CPC ............................. H04L 5/0048; H04B 17/382
See application file for complete search history.

(56) References Cited

U.S. PATENT DOCUMENTS

| 2015/0358131 | A1 | 12/2015 | Siomina et al. |
| 2017/0013630 | A1* | 1/2017 | Franz ............... H04W 24/10 |

(Continued)

FOREIGN PATENT DOCUMENTS

| CN | 103369587 A | 10/2013 |
| CN | 104272835 A | 1/2015 |

(Continued)

OTHER PUBLICATIONS

Decision To Grant a Patent for Invention issued by the Federal Service for Intellectual Property (ROSPATENT) for Application No. 2019113753/07(026540)—dated Sep. 23, 2019.

(Continued)

*Primary Examiner* — Kent Krueger
(74) *Attorney, Agent, or Firm* — Baker Botts L.L.P.

(57) ABSTRACT

A method, in a user equipment, for performing one or more radio measurements is provided. The method comprises determining that the user equipment is to perform one or more radio measurements using a first set of reference time resources on at least a first cell operating on a first carrier frequency. The method further comprises adaptively performing reference signal carrier-based switching for transmitting a reference signal on a second cell operating on a second carrier frequency based on the determined first set of reference time resources. A method in a network node is also provided. The method comprises determining that a user equipment is to perform one or more radio measurements using a first set of reference time resources on at least a first cell operating on a first carrier frequency. The method further comprises determining that the user equipment is to adaptively perform reference signal carrier based switching (Continued)

for transmitting a reference signal on a second cell operating on a second carrier frequency based on the determined first set of reference time resources. The method further comprises using a result of the adaptive reference signal carrier based switching for one or more operational tasks.

21 Claims, 15 Drawing Sheets

(56) References Cited

U.S. PATENT DOCUMENTS

| | | | |
|---|---|---|---|
| 2017/0279580 A1* | 9/2017 | Chen | H04L 5/0094 |
| 2018/0083752 A1* | 3/2018 | Kim | H04W 72/0453 |
| 2019/0165908 A1* | 5/2019 | Takeda | H04W 8/24 |

FOREIGN PATENT DOCUMENTS

| | | |
|---|---|---|
| CN | 104335631 A | 2/2015 |
| CN | 105684341 A | 6/2016 |
| JP | 2012 529836 A | 11/2012 |
| JP | 2012 531066 A | 12/2012 |
| RU | 2575115 C2 | 2/2012 |
| WO | 2012 150894 A1 | 11/2012 |
| WO | 2013 171138 A2 | 11/2013 |
| WO | 2014 024411 A1 | 2/2014 |
| WO | 2014 068530 A1 | 5/2014 |
| WO | WO2015 15997 A1 | 6/2015 |
| WO | WO2016086120 A1 | 6/2016 |
| WO | WO2016115548 A1 | 7/2016 |
| WO | 2016 124243 A1 | 8/2016 |
| WO | WO2016119475 A1 | 8/2016 |

OTHER PUBLICATIONS

3GPP TSG-RAN WG2 #95bis; Kaohsiung, Taiwan; Source: Ericsson; Title: Interruptions due to SRS switching (Tdoc R2-166939)—Oct. 10-14, 2016.
Japanese Notice of Reasons for Rejection issued for Patent Application No. 2019-519218—dated Jun. 9, 2020.
3GPP TS 36.214 v14.0.0; Technical Specification; 3rd Generation Partnership Project; Technical Specification Group Radio Access Network; Evolved Universal Terrestrial Radio Access (E-UTRA); Physical layer; Measurements (Release 14)—Sep. 2016.
Communication Pursuant to Article 94(3) EPC issued for Application No. 17 788 162.0-1205—dated Aug. 21, 2020.
Advanced Carrier Aggregation Techniques for Multi-Carrier Ultra-Dense Networks, LTE-Advanced Pro by Jialing Liu and Weimin Xiao—Jul. 2016.
International Search Report for International application No. PCT/EP2017/075799—dated Nov. 27, 2017.
3GPP TSG-RAN WG4 Meeting #78bis; San Jose del Cabo, MX; Source: Huawei, HiSilicon; Title: Discussion on SRS carrier based switching (R4-162440)—April 11-15, 2016.
3GPP TSG RAN WG4 Meeting #80; Gothenburg, Sweden; Source: Ericsson; Title: RRM requirements impacts with SRS carrier based switching (R4-165303)—Aug. 22-26, 2016.
Intellectual Property India Office Action in Application No. 201917011058 dated Feb. 12, 2021, 7 pages.
China Patent Office Official Action and Search Report in Application No. 201780063019.2 dated Feb. 24, 2021, 10 pages.
Notice of Opinion Submission issued by the Korean Patent office for for Application No. 10-2019-7009965—dated Sep. 2, 2020.
China Patent Office Official Action and Search Report dated Sep. 8, 2021 (not translated).

* cited by examiner

METHODS AND APPARATUS FOR ADAPTING SRS SWITCHING ACCOUNTING FOR MEASUREMENT PROCEDURE

PRIORITY

This nonprovisional application is a U.S. National Stage Filing under 35 U.S.C. § 371 of International Patent Application Serial No. PCT/EP2017/075799 filed Oct. 10, 2017 and entitled "Methods and Apparatus for Adapting SRS Switching Accounting for Measurement Procedure" which claims priority to U.S. Provisional Patent Application No. 62/406,818 filed Oct. 11, 2016 both of which are hereby incorporated by reference in their entirety.

TECHNICAL FIELD

The present disclosure relates, in general, to wireless communications and, more particularly, to Reference Signal, RS, switching, in particular Sounding Reference Signal, SRS, switching.

BACKGROUND

Sounding Reference Signals

Sounding reference signals (SRS) are known signals that are transmitted by user equipment (UEs), for example to allow the eNodeB to estimate different uplink (UL)-channel properties. These estimates may be used, for example, for UL scheduling and link adaptation, as well as for downlink (DL) multiple antenna transmission (especially in case of Time Division Duplex (TDD) where the UL and DL use the same frequencies).

FIG. 1 illustrates an UL transmission subframe. The SRS are defined in FIG. 1 and have time duration of a single Orthogonal Frequency Division Multiplexing (OFDM) symbol. SRS can be transmitted in the last symbol of a 1 ms UL subframe, and for the case with TDD, the SRS can also be transmitted in the special slot UpPTS (Uplink Pilot TimeSlot). The length of UpPTS can be configured to be one or two symbols.

FIG. 2 illustrates an example for TDD with 3DL:2UL. More particularly, FIG. 2 illustrates an example with a DL:UL ratio of 3:2 within a 10 ms radio frame. Up to eight symbols may be set aside for SRS.

The configuration of SRS symbols, such as SRS bandwidth, SRS frequency domain position, SRS hopping pattern and SRS subframe configuration are set semi-statically as a part of Radio Resource Control (RRC) information element.

There are two types of SRS transmission in Long Term Evolution (LTE) UL: periodic and aperiodic SRS transmission. Periodic SRS is transmitted at regular time instances as configured by means of RRC signaling. Aperiodic SRS is a one-shot transmission that is triggered by signaling in the Physical Downlink Control Channel (PDCCH).

There are in fact two different configurations related to SRS: cell-specific SRS configuration and UE-specific SRS configuration. The cell-specific SRS configuration in essence indicates what subframes may be used for SRS transmissions within the cell as illustrated in FIG. 2.

The UE-specific SRS configuration indicates to the terminal a pattern of subframes (among the subframes reserved for SRS transmission within the cell) and frequency domain resources to be used for SRS transmission of that specific UE. It also includes other parameters that the UE shall use when transmitting the signal, such as frequency domain comb and cyclic shift.

This means that SRS from different UEs can be multiplexed in the time domain, by using UE-specific configurations such that the SRS of the two UEs are transmitted in different subframes. Furthermore, within the same symbol, SRSs can be multiplexed in the frequency domain. The set of subcarriers is divided into two sets of subcarriers, or combs with the even and odd subcarriers respectively in each such set. Additionally, UEs may have different bandwidths to get additional FDM. The comb enables frequency domain multiplexing of signals with different bandwidths and also overlapping. Additionally, code division multiplexing can be used. Then different users can use exactly the same time and frequency domain resources by using different shifts of a basic base sequence.

SRS Carrier-Based Switching

In LTE networks, there are many kinds of DL heavier traffic, which leads to a greater number of aggregated DL component carriers (CC) than the number of (aggregated) uplink CCs. For the existing UE categories, typical carrier aggregation (CA) capable UEs only support one or two uplink CCs, while up to 5 CCs can be aggregated in DL.

For the carrier supporting both UL and DL, transmit diversity based feedback without Precoding Matrix Indicator (PMI) and with SRS is beneficial as channel reciprocity can be used. However, a UE generally has the capability of aggregating a larger number of DL carriers than UL carriers. As a result, some TDD carriers with DL transmission for the UE will have no UL transmission including SRS, and channel reciprocity cannot be utilized for these carriers. Such situations will become more severe with carrier aggregation, CA, enhancement of up to 32 CCs, where a large portion of CCs are TDD. Allowing fast carrier switching to and between TDD UL carriers is one approach to allow SRS transmission on these TDD carriers, and should be supported.

SRS carrier-based switching is aiming to support SRS switching to and between TDD CCs, where the CCs available for SRS transmission correspond to the CCs available for CA of Physical Downlink Shared Channel (PDSCH), while the UE has fewer CCs available for CA of Physical Uplink Shared Channel (PUSCH).

SRS based carrier switching simply means that during certain time resources the UE does not transmit any signal on one carrier (e.g., F1) while it transmits SRS on another carrier (e.g., F2). For example F1 and F2 can be Primary Cell, PCell, and Secondary Cell, SCell, respectively, or both of them can be SCells.

Radio Measurements

UE Radio Measurements

In order to support different functions such as mobility (e.g., cell selection, cell reselection, handover, RRC re-establishment, connection release with redirection, etc.), minimization of drive tests, self-organizing network (SON), positioning, etc., the UE is required to perform one or more measurements on the signals transmitted by neighboring cells. Prior to performing such measurements, the UE has to identify a cell and determine its physical cell identity (PCI). PCI determination is therefore also a type of a measurement.

The UE receives measurement configuration or an assistance data/information, which is a message or an information element (IE) sent by the network node (e.g., serving eNode B, positioning node, etc.) to configure the UE to perform the requested measurements. It may contain, for example, information related to the carrier frequency, radio access technologies (RATs), type of measurement (e.g., Reference Signal Received Power (RSRP)), higher layer time domain filtering, measurement bandwidth related parameters, etc.

The measurements are done by the UE on the serving cell as well as on neighbor cells over some known reference symbols or pilot sequences. The measurements are done on cells on an intra-frequency carrier, inter-frequency carrier(s) as well as on inter-RAT carriers(s) (depending upon the UE capability (e.g., whether it supports that RAT)).

To enable inter-frequency and inter-RAT measurements for a UE requiring gaps, the network has to configure the measurement gaps. Two periodic measurement gap patterns, both with a measurement gap length of 6 ms, are defined for LTE:

Measurement gap pattern #0 with repetition period 40 ms; and

Measurement gap pattern #1 with repetition period 80 ms.

In High-Speed Packet Access (HSPA), the inter-frequency and inter-RAT measurements are performed in compressed mode gaps, which are also a type of network configured measurement gap.

Some measurements may also require the UE to measure the signals transmitted by the UE in the UL. The measurements are done by the UE in Radio Resource Control (RRC) connected state or in CELL_DCH state (in HSPA), as well as in low activity RRC states (e.g., idle state, CELL_FACH state in HSPA, URA_PCH and CELL_PCH states in HSPA, etc.).

In a multi-carrier or CA scenario, the UE may perform the measurements on the cells on the primary component carrier (PCC) as well as on the cells on one or more secondary component carriers (SCCs).

The measurements are done for various purposes. Some example measurement purposes include, but are not limited to: mobility, positioning, self-organizing network (SON), minimization of drive tests (MDT), operation and maintenance (O&M), network planning and optimization, etc.

The measurements are typically performed over a longer time duration in the order of a few 100 ms to a few seconds. The same measurements are applicable in single carrier and CA. In CA, however, the measurement requirements may be different. For example, the measurement period may be different in CA (i.e., it can be either relaxed or more stringent depending upon whether the SCC is activated or not). This may also depend upon the UE capability (i.e., whether a CA capable UE is able to perform measurement on SCC with or without gaps).

Examples of mobility measurements in LTE include, but are not limited to:

Reference symbol received power (RSRP); and
Reference symbol received quality (RSRQ);

Examples of mobility measurements in HSPA include, but are not limited to:

Common pilot channel received signal code power (CPICH RSCP); and
CPICH Ec/No.

An example of mobility measurements in GSM/GERAN is:

GSM carrier RSSI

Examples of mobility measurements in CDMA2000 systems include, but are not limited to:

Pilot strength for CDMA2000 1×RTT
Pilot strength for HRPD

The mobility measurement may also comprise identifying or detecting a cell, which may belong to LTE, HSPA, CDMA2000, GSM, etc. Cell detection comprises identifying at least the physical cell identity (PCI) and subsequently performing the signal measurement (e.g., RSRP) of the identified cell. The UE may also have to acquire the cell global ID (CGI) of a UE. In HSPA and LTE, the serving cell can request the UE to acquire the system information (SI) of the target cell. More specifically, the SI is read by the UE to acquire the cell global identifier (CGI), which uniquely identifies a cell, of the target cell. The UE may also be requested to acquire other information such as CSG indicator, CSG proximity detection, etc., from the target cell.

Examples of positioning measurements in LTE are:

Reference signal time difference (RSTD)

UE Receive-Transmit (RX-TX) time difference measurement

The UE RX-TX time difference measurement requires the UE to perform measurement on the DL reference signal as well as on the UL transmitted signals.

Examples of other measurements that may be used for radio link maintenance (RLM), MDT, SON or for other purposes include, but are not limited to:

Control channel failure rate or quality estimate, for example:
  Paging channel failure rate; and
  Broadcast channel failure rate; and
Physical layer problem detection, for example;
  Out of synchronization (out of sync) detection;
  In synchronization (in-sync) detection;
  Radio link monitoring; and
  Radio link failure determination or monitoring.

CSI measurements performed by the UE are used for scheduling, link adaptation, etc. by the network. Examples of CSI measurements include Channel Quality Indicators (CQI), Precoding Matrix Indicator (PMI), Rank Indicator (RI), etc.

The radio measurements performed by the UE are used by the UE for one or more radio operational tasks. Examples of such tasks include reporting the measurements to the network, which in turn may use them for various tasks. For example, in RRC connected state the UE reports radio measurements to the serving node. In response to the reported UE measurements, the serving network node takes certain decisions (e.g., it may send mobility command to the UE for the purpose of cell change). Examples of cell change include handover, RRC connection re-establishment, RRC connection release with redirection, PCell change in CA, PCC change in PCC, etc. In idle or low activity state, an example of cell change is cell reselection. In another example, the UE may itself use the radio measurements for performing tasks e.g. cell selection, cell reselection, etc.

Radio Network Node Radio Measurements

In order to support different functions such as mobility (e.g., cell selection, handover, etc.), positioning a UE, link adaption, scheduling, load balancing, admission control, interference management, interference mitigation, etc., the radio network node also performs radio measurements on signals transmitted and/or received by the radio network node. Examples of such measurements include, but are not limited to: Signal-to-Noise Ratio (SNR), Signal to Interference plus Noise Ratio (SINR), received interference power (RIP), block error rate (BLER), propagation delay between UE and itself, transmit carrier power, transmit power of specific signals (e.g., Tx power of reference signals), positioning measurements, etc.

CA-Related Interruptions in LTE

The current CA-related interruption requirements are specified in 36.133, v13.3.0, for example, as reproduced below:

======<<<<<<TS 36.133>>>>>>======

7.8.2.3 Interruptions at SCell Activation/Deactivation for Intra-Band CA

When an intra-band SCell is activated or deactivated as defined in [2] the UE is allowed an interruption of up to 5 subframes on PCell during the activation/deactivation delay defined in Section 7.7. This interruption is for both uplink and downlink of PCell.

7.8.2.4 Interruptions at SCell Activation/Deactivation for Inter-Band CA

When an inter-band SCell is activated or deactivated as defined in [2] the UE that requires interruption is allowed an interruption of up to 1 subframe on PCell during the activation/deactivation delay defined in Section 7.7. This interruption is for both uplink and downlink of PCell.

======<<<<<<TS 36.133>>>>>>======

Similar interruptions may occur also due to SRS switching.

Licensed-Assisted Access and Frame Structure Type 3
Licensed-Assisted Access to Unlicensed Spectrum using LTE The unlicensed spectrum (e.g., in 5-6 GHz range such as between: 5150 MHz-5925 MHz) can be simultaneously used by multiple different technologies (e.g., between LTE and IEEE Wi-Fi). The "Licensed-Assisted Access" (LAA) intends to allow LTE equipment to also operate in an unlicensed radio spectrum. Note that, the same LAA concept can be used in other spectrum (i.e., 3.5 GHz in North America) too. In LAA mode, devices connect in the licensed spectrum (primary cell or PCell) and use carrier aggregation to benefit from additional transmission capacity in the unlicensed spectrum (secondary cell or SCell). Therefore, UE can be configured with one or more SCells in the unlicensed spectrum, which are operated with frame structure type 3.

Since the unlicensed spectrum must be shared with other wireless technologies (e.g., Wi-Fi, radar, Bluetooth, fixed satellite system, etc.), a so called listen-before-talk (LBT) method needs to be applied. LBT involves sensing the medium for a pre-defined minimum amount of time on whether there is a transmission or not; and backing off if the channel is busy (i.e., not transmitting if there is a transmission in the channel).

FIG. 3 illustrates an example of licensed-assisted access to unlicensed spectrum using LTE carrier aggregation.

Standalone Access of Unlicensed Spectrum using LTE

There will also be LTE systems operating in unlicensed spectrum completely in a standalone manner. The difference between LAA and "standalone LTE in unlicensed band" will be that there will not be any licensed carrier to be aggregated with unlicensed carrier in standalone usage, while an unlicensed LTE carrier is always aggregated with licensed carrier in LAA operations. Standalone operation means that UL will also be allowed in unlicensed spectrum usage of LTE. Since there will not be any support from a licensed carrier, the standalone LTE system is responsible for all functionalities in unlicensed spectrum.

In a standalone operation, a UE may be capable of only using a single carrier, or be capable of aggregating more than one unlicensed carriers at the same. In that case, both PCell and SCell(s) will be in unlicensed spectrum.

LAA Operation in Dual Connectivity Mode

The unlicensed carrier can also be aggregated with a licensed carrier in dual connectivity (DC) manner. In DC mode, at least one Component Carrier, CC, in the Master evolved Node B, eNB, (MeNB) is termed as PCell and at least one CC in the Secondary eNB (SeNB) is termed as PSCell. PCell and PSCell are functionally similar nodes. However, activation/deactivation/configuration/deconfigurationof PSCell is controlled by the PCell. The connected nodes in DC operation are independent to each other. Thus, all control signaling is done in a separate way.

License-Shared Operation of LTE

In a licensed shared spectrum, more than one RAT have permission to access the spectrum, where all the RATs have equal status in terms of priority. The allowed systems access the spectrum based on a fairness criterion (e.g., LBT). This is also called horizontal sharing of the spectrum.

In the future, LTE may also be used in such spectrum scenarios.

SUMMARY

According to one example embodiment, a method in a user equipment is disclosed. The method comprises determining that the UE is to perform one or more radio measurements using a first set of reference time resources (R1) on at least a first cell (cell1) operating on a first carrier frequency (F1). That is, determining that the UE is expected to perform one or more radio measurements using the first set of reference time resources (R1). The method comprises adaptively performing RS carrier-based switching for transmitting RS on a second cell (cell2) operating on a second carrier frequency (F2) based on the determined first set of reference time resources (R1).

The user equipment may adaptively perform reference signal carrier-based switching for transmitting a reference signal on a second cell operating on a second carrier frequency based on the determined first set of reference time resources so as to ensure that the first set of reference time resources is available for radio measurement. The first set of reference time resources may comprise at least one of: downlink subframe number 0 or downlink subframe number 5 per radio frame; downlink subframes containing positioning reference signals; downlink subframes containing discovery signals; and at least one downlink subframe and uplink subframe per radio frame for UE Rx-Tx time difference measurement. Determining that the user equipment is to perform one or more radio measurements using a first set of reference time resources on at least a first cell operating on a first carrier frequency may comprise determining that the user equipment is to perform one or more radio measurements using a first set of reference time resources on at least a first cell operating on a first carrier frequency based on at least one of: known measurement sample periodicity; and a measurement configuration or indication received from a network node.

Adaptively performing reference signal carrier-based switching for transmitting a reference signal on a second cell operating on a second carrier frequency based on the determined first set of reference time resources may comprise adapting a reference signal carrier-based switching configuration. This may comprise adapting one or more of: a reference signal switching period; a number or set of carriers involved in reference signal carrier based switching; a sequence in which carriers are switched; reference signal switching loop length; one or more reference signal transmission parameters; time-to-stay on carrier during reference signal carrier based switching; minimum or maximum time before reference signal transmission on the second carrier frequency when the user equipment switches to the second carrier frequency; and minimum or maximum time after reference signal transmission on the second carrier frequency when the user equipment switches from the second carrier frequency. The user equipment may adaptively perform said reference signal carrier-based switching based on at least one of: a predefined rule; a pre-defined configuration; and assistance data received from a network node.

The method may further comprise adaptively performing reference signal carrier-based switching for transmitting a reference signal on the second cell operating on the second carrier frequency based on a second set of time resources; wherein the second set of time resources is expected to be used by the user equipment for performing measurements on one of a further cell on the first carrier frequency and a further cell on the second carrier frequency.

The method may further comprise performing one or more measurements using the determined first set of reference time resources. The method may further comprise using a result of the adaptive reference signal carrier based switching for one or more operational tasks.

The reference signal may be a Sounding Reference Signal, SRS. However, the reference signal may be any other type of reference signal, for example a demodulation reference signal, a UE specific reference signal or pilot signal.

In certain embodiments, one or more of the following may apply:
the method may comprise signaling to another node (e.g., a network node or another UE) a capability related to the UE's ability to adapt RS switching in order to reduce, minimize or avoid interruption on critical signals used for performing measurements;
the method may comprise using a result of the adaptive RS carrier-based switching for one or more operational tasks.

According to another example embodiment, a user equipment is disclosed. The user equipment comprises one or more processors. The one or more processors are configured to determine that the UE is to perform one or more radio measurements using a first set of reference time resources (R1) on at least a first cell (cell1) operating on a first carrier frequency (F1). The one or more processors are configured to adaptively perform RS carrier-based switching for transmitting RS on a second cell (cell2) operating on a second carrier frequency (F2) based on the determined first set of reference time resources (R1).

According to another example embodiment, a method in a network node is disclosed. The method comprises determining that a UE is to perform one or more radio measurements using a first set of reference time resources (R1) on at least a first cell (cell1) operating on a first carrier frequency (F1). The method comprises determining that the UE is to adaptively perform RS carrier-based switching for transmitting RS on a second cell (cell2) operating on a second carrier frequency (F2) based on the determined first set of reference time resources (R1). The method comprises using a result of the adaptive RS carrier-based switching for one or more operational tasks.

The method may comprise configuring the user equipment to adaptively perform reference signal carrier based switching for transmitting a reference signal on a second cell operating on a second carrier frequency based on the determined first set of reference time resources.

The first set of reference time resources may comprise at least one of: downlink subframe number 0 or downlink subframe number 5 per radio frame; downlink subframes containing positioning reference signals; downlink subframes containing discovery signals; at least one downlink subframe and uplink subframe per radio frame for UE Rx-Tx time difference measurement.

The method may further comprise transmitting a measurement configuration to the user equipment; wherein the measurement configuration indicates the first set of reference time resources.

The reference signal may be a Sounding Reference Signal, SRS. However, the reference signal may be any other type of reference signal, for example a demodulation reference signal, a UE specific reference signal or pilot signal.

In certain embodiments, one or more of the following may apply:
the method may comprise obtaining a UE's capability related to its ability to adapt RS carrier based switching to minimize, avoid, or reduce the impact of RS switching on the UE measurement procedure.

According to another example embodiment, a network node is disclosed. The network node comprises one or more processors. The one or more processors are configured to determine that a UE is to perform one or more radio measurements using a first set of reference time resources (R1) on at least a first cell (cell1) operating on a first carrier frequency (F1). The one or more processors are configured to determine that the UE is to adaptively perform RS carrier-based switching for transmitting RS on a second cell (cell2) operating on a second carrier frequency (F2) based on the determined first set of reference time resources (R1). The one or more processors are configured to use a result of the adaptive RS carrier-based switching for one or more operational tasks.

Certain embodiments of the present disclosure may provide one or more technical advantages. For example, in certain embodiments the procedures such as downlink, DL, and/or uplink, UL, scheduling relying on RS quality may not be affected since UE behavior in terms of adaptive RS carrier-based switching is well defined. As another example, in certain embodiments a UE may be able to perform measurements and meet all the requirements while the UE is performing RS carrier-based switching. As still another example, in certain embodiments UE mobility procedures that depend on RRM measurements may not be degraded due to RS switching. As yet another example, in certain embodiments SI reading quality may advantageously be maintained, even if the UE is performing RS switching. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
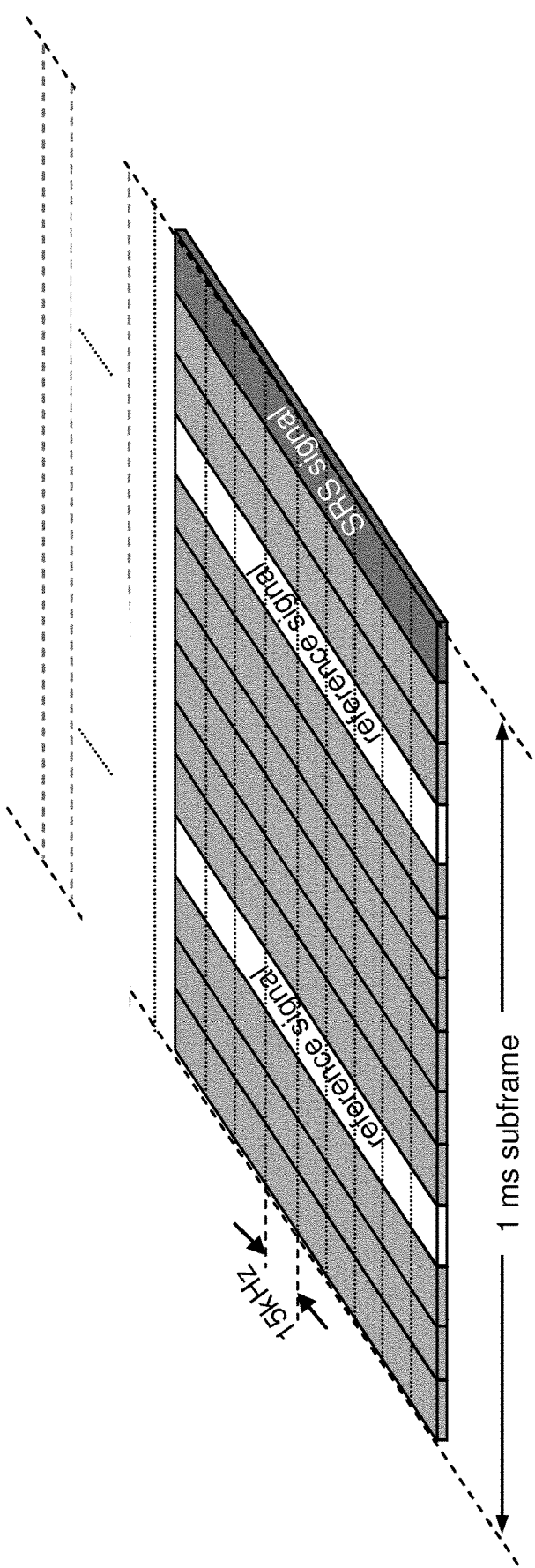
FIG. 1 illustrates an UL transmission subframe.
Figure 2:
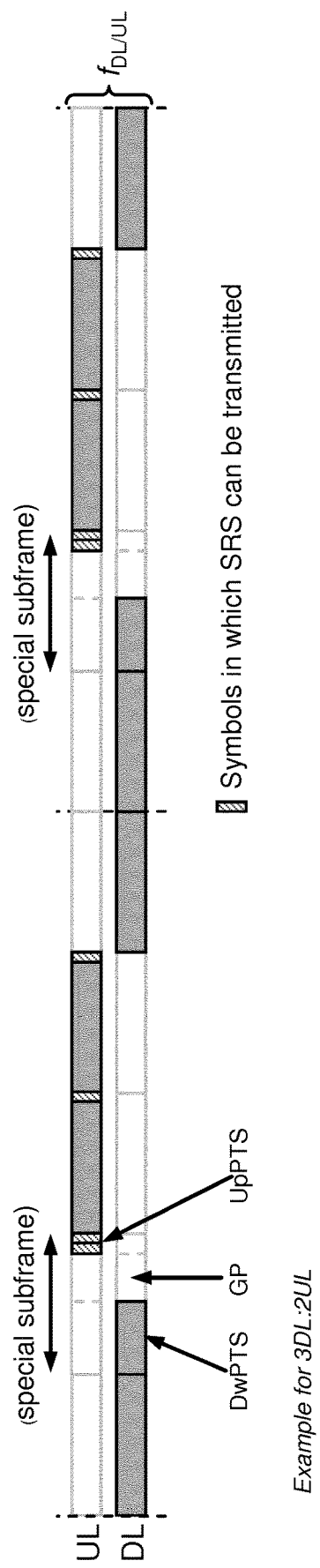
FIG. 2 illustrates an example for TDD with 3DL:2UL.
Figure 3:
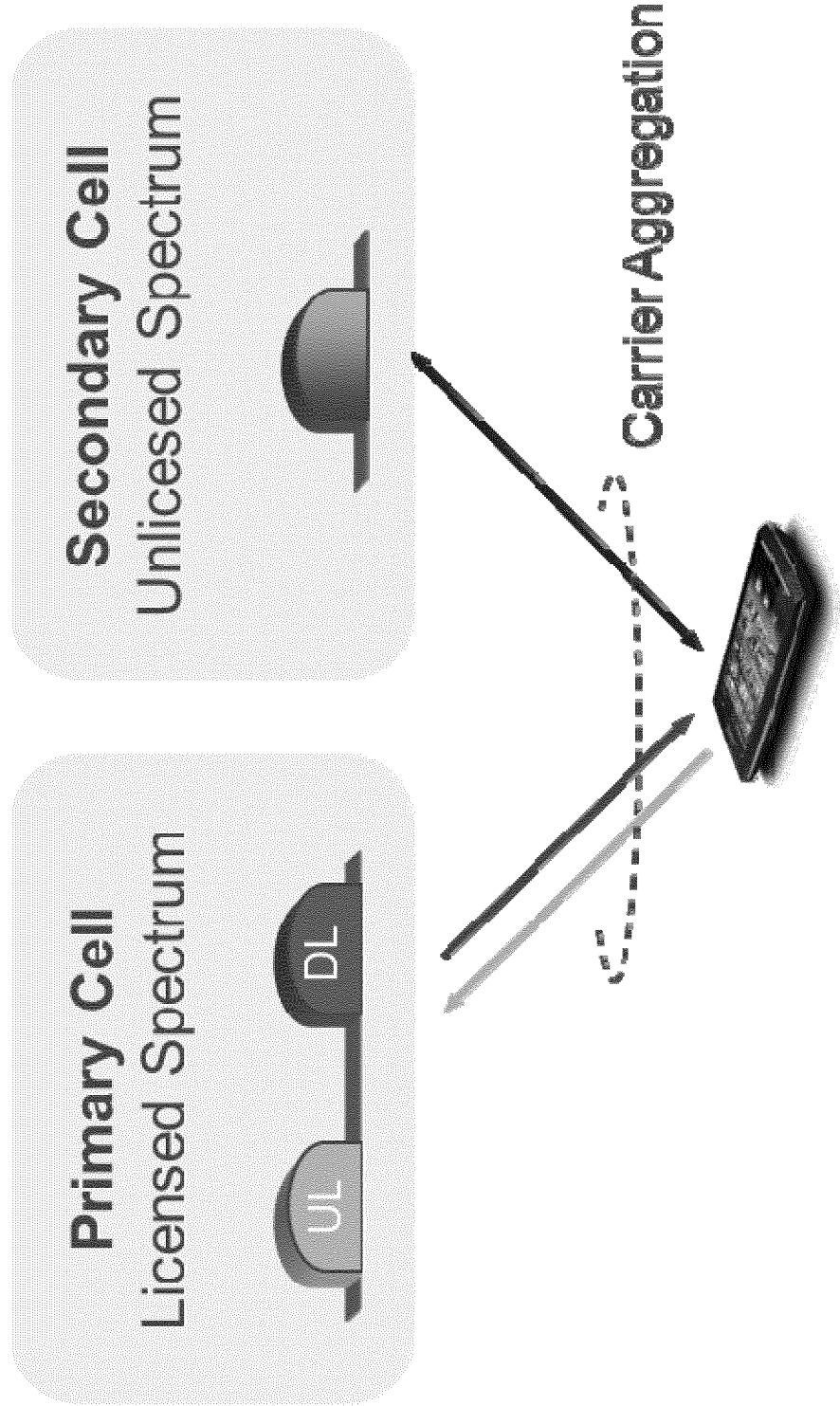
FIG. 3 illustrates an example of licensed-assisted access to unlicensed spectrum using LTE carrier aggregation.

The SRS carrier-based switching causes interruption in one or more serving cells of the UE. The interruption may affect reference signals that are used by the UE for performing the measurements. According to existing approaches, the UE measurement requirements are relaxed under SRS switching. This, however, may not be acceptable for certain types of critical measurements (e.g., positioning, etc.). The applicant has appreciated that new mechanisms are needed to avoid the degradation of measurement performance under SRS switching.

The present disclosure contemplates various embodiments that may address these and other deficiencies associated with existing approaches. In certain embodiments, a UE adapts an SRS carrier-based switching configuration in order to minimize or avoid interruption in subframes containing critical signals (e.g., reference signals, discovery reference signals (DRS), or channels with SI) belonging to cells of carriers on which the UE is performing measurements. The adaptive SRS carrier based switching operation ensures that the UE is able to meet the measurement requirements.

According to one example embodiment, a method in a user equipment is disclosed. The UE determines that the UE is to perform one or more radio measurements using a first set of reference time resource (R1) on at least a first cell (cell1) operating on a first carrier frequency (F1). In certain embodiments, the UE may signal to another node (e.g., a network node or another UE) the first node's capability related to the UE's ability to adapt SRS switching in order to reduce, minimize or avoid interruption on critical signals (e.g., reference signals or channels with SI) used for performing measurements. The UE adaptively performs SRS carrier-based switching for transmitting SRS on a second cell (cell2) operating on a second carrier frequency (F2) based on the determined first set of reference time resources (R1). In certain embodiments, the UE uses a result of the adaptive SRS carrier-based switching for one or more operational tasks.

According to another example embodiment, a method in a network node is disclosed. The network node determines that a UE is to perform one or more radio measurements using a first set of reference time resource (R1) on at least a first cell (cell1) operating on a first carrier frequency (F1). In certain embodiments, the network node may obtain the UE's capability related to its ability to adapt SRS carrier-based switching to minimize, avoid, or reduce the impact of SRS switching on the UE measurement procedure. The network node determines that the UE is to adaptively perform SRS carrier-based switching for transmitting SRS on a second cell (cell2) operating on a second carrier frequency (F2) based on the determined first set of reference time resources (R1). The network node uses a result of the adaptive SRS carrier based switching for one or more operational tasks.

According to another example embodiment, a method in a network node is disclosed. The network node determines that a UE is to perform one or more radio measurements using a first set of reference time resource (R1) on at least a first cell (cell1) operating on a first carrier frequency (F1). In certain embodiments, the network node obtains the UE's capability related to its ability to adapt SRS carrier-based switching to minimize, avoid, or reduce the impact of SRS switching on the UE measurement procedure. The network node configures the UE to adaptively perform SRS carrier-based switching for transmitting SRS on a second cell (cell2) operating on a second carrier frequency (F2) based on the determined first set of reference time resources (R1). The network node uses a result of the adaptive SRS carrier-based switching for one or more operational tasks.

Certain embodiments of the present disclosure may provide one or more technical advantages. For example, in certain embodiments the procedures such as DL and/or UL scheduling relying on SRS quality may not be affected since UE behavior in terms of adaptive SRS carrier-based switching is well defined. As another example, in certain embodiments a UE may be able to perform measurements and meet all the requirements while the UE is performing SRS carrier-based switching. As still another example, in certain embodiments UE mobility procedures that depend on RRM measurements may not be degraded due to SRS switching. As yet another example, in certain embodiments SI reading quality may advantageously be maintained, even if the UE is performing SRS switching. Other advantages may be readily apparent to one having skill in the art. Certain embodiments may have none, some, or all of the recited advantages.

Figure 4:
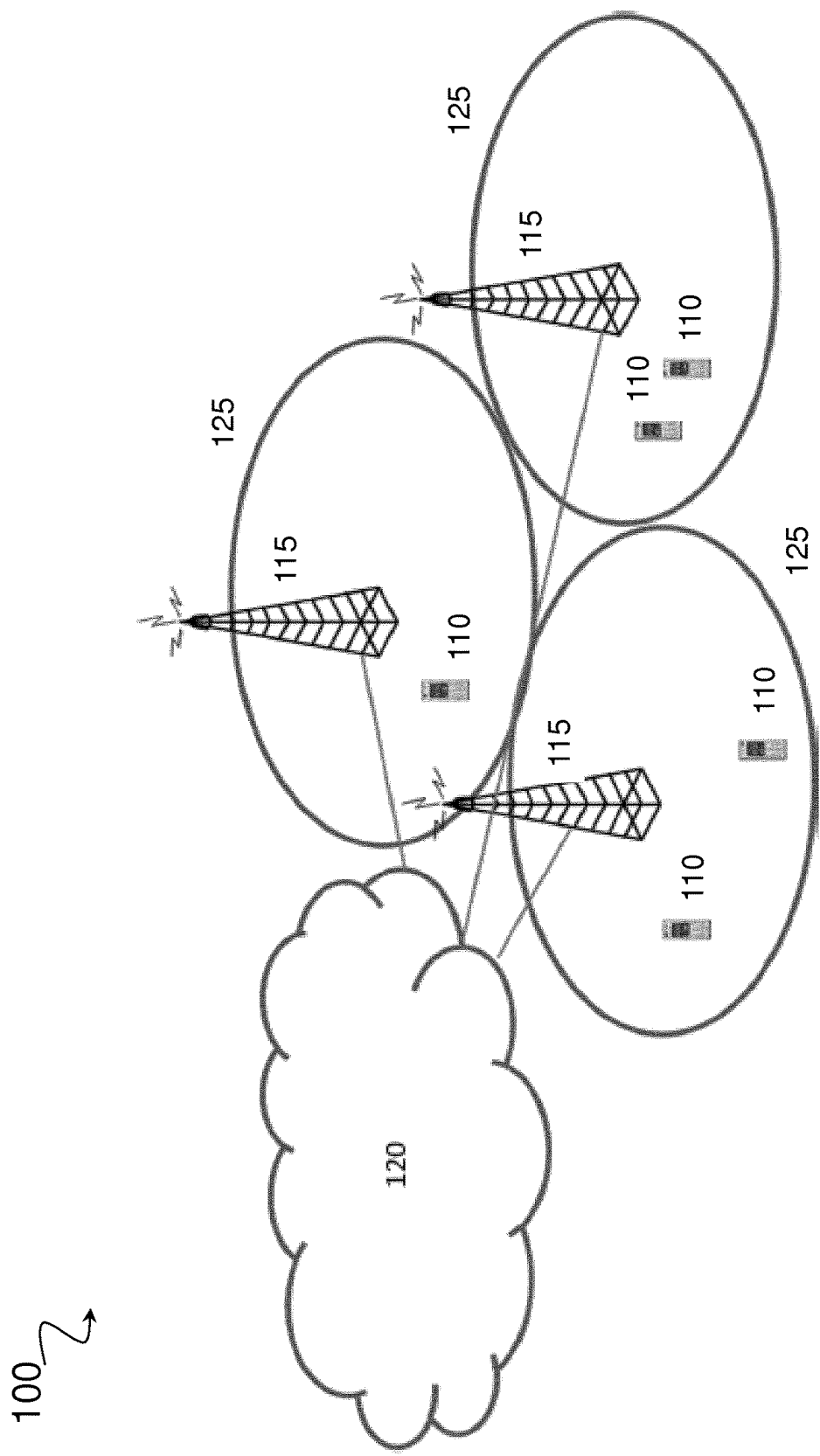
FIG. 4 is a schematic diagram of an exemplary wireless communication network, in accordance with certain embodiments.

FIG. 4 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE in a cellular or mobile communication system. UE 110 may also be a radio communication device, target device, D2D UE, machine-type-communication UE or UE capable of machine to machine communication (M2M), low-cost and/or low-complexity UE, a sensor equipped with UE, PDA, Tablet, iPad, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

As used herein, the term "network node" may refer to a radio network node or another network node, for example a core network node, MSC, Mobility Management Entity (MME), Operations & Management (O&M), OSS, Self-Organizing Network (SON), positioning node (e.g., E-SMLC), Minimization of Drive Tests (MDT) node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 9-13.

Although FIG. 4 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone).

Furthermore, although certain embodiments may be described as implemented in a LTE network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to UTRA, E-UTRA, narrow band internet of things (NB-IoT), WiFi, Bluetooth, next generation RAT (NR), 4G, 5G, LTE, LTE-Advanced, UMTS, HSPA, GSM, cdma2000, WCDMA, WiMax, UMB, another suitable radio access technology, or any suitable combination of one or more radio access technologies. Although certain embodiments may be described in the context of wireless transmissions in the downlink, the present disclosure contemplates that the various embodiments are equally applicable in the uplink.

Any of the above mentioned nodes (UE, network node, or radio network node) can be "the first node" and/or "the second node" in the various embodiments described herein. The first node and the second node may be capable of at least one of transmitting and receiving in licensed and/or unlicensed spectrum. Any of the first and the second nodes may be capable of supporting a single or multiple RATs.

A UE may be configured to operate in CA, implying aggregation of two or more carriers in at least one of DL and UL directions. With CA, a UE can have multiple serving cells, wherein the term "serving" herein means that the UE is configured with the corresponding serving cell and may receive from and/or transmit data to the network node on the serving cell (e.g., on PCell or any of the SCells). The data is transmitted or received via physical channels (e.g., PDSCH in DL, PUSCH in UL, etc.). A CC (which may be interchangeably referred to as a carrier or aggregated carrier), PCC or SCC is configured at the UE by the network node using higher layer signaling (e.g., by sending a RRC configuration message to the UE). The configured CC is used by the network node for serving the UE on the serving cell (e.g., on PCell, PSCell, SCell, etc.) of the configured CC. The configured CC is also used by the UE for performing one or more radio measurements (e.g., RSRP, RSRQ, etc.) on the cells operating on the CC (e.g., PCell, SCell or PSCell) and neighboring cells.

The term dual connectivity used herein may refer to the operation mode wherein the UE can be served by at least two nodes called master eNB (MeNB) and secondary eNB (SeNB). More generally, in multiple connectivity (also known as multi-connectivity) operation the UE can be served by two or more nodes (e.g., MeNB, SeNB1, SeNB2 and so on). The UE is configured with PCC from both MeNB and SeNB. The PCell from MeNB and SeNB are referred to as PCell and PSCell, respectively. Typically, the PCell and PSCell operate the UE independently. The UE is also configured with one or more SCCs from each of MeNB and SeNB. The corresponding secondary serving cells served by MeNB and SeNB are called SCell. Typically, the UE in DC has separate TX/RX for each of the connections with MeNB and SeNB. This allows the MeNB and SeNB to independently configure the UE with one or more procedures (e.g., radio link monitoring (RLM), discontinuous reception (DRX) cycle, etc.) on their PCell and PSCell, respectively.

As used herein, the term SRS may refer to any type of reference signal (RS), or more generally to physical radio signals transmitted by the UE in the UL to enable the network node to determine the UL signal quality (e.g., UL SNR, SINR, etc.). Examples of such reference signals are sounding reference signals, demodulation reference signals (DMRS), UE specific reference or pilot signals, etc. The various embodiments described herein are applicable to any type of RS (i.e., switching of carrier transmitting any type of RS).

As used herein, the term signal can be any physical signal (e.g., reference signal such as Primary Synchronization Signal (PSS), Secondary Synchronization Signal (SSS), Cell-Specific Reference Signal (CRS), Positioning Reference Signal (PRS), etc.).

As used herein, the term channel (e.g., in the context of channel reception) can be any physical channel (e.g., Master Information Block (MIB), Physical Broadcast Channel (PBCH), Narrowband PBCH (NPBCH), Physical Downlink Control Channel (PDCCH), Physical Downlink Shared Channel (PDSCH), MPDCCH, Narrowband PDCCH (NPDCCH), Narrowband PDSCH (NPDSCH), E-PDCCH, Physical Uplink Shared Channel (PUSCH), Physical Uplink Control Channel (PUCCH), Narrowband PUSCH (NPUSCH), etc.).

As used herein, the term time resource may correspond to any type of physical resource or radio resource expressed in terms of length of time. Examples of time resources include, but are not limited to: symbol, time slot, subframe, radio frame, Transmission Time Interval (TTI), interleaving time, etc.

As used herein, the term radio measurement may comprise any measurement based on receiving a radio signal or channel (e.g., power-based measurements such as received signal strength (e.g., Reference Signal Received Power, RSRP, or CSI-RSRP) or quality measurements (e.g., RSRQ, RS-SINR, SINR, Es/Iot, SNR); cell identification; synchronization signals measurements; angle measurements such as angle of arrival (AOA); timing measurements such as Rx-Tx, Round Trip Time (RTT), Reference Signal Time Difference (RSTD), Time of Arrival (TOA), Time Difference of Arrival (TDOA), timing advance; throughput measurements; channel quality measurements such Channel State Information (CSI), Channel Quality Indicators (CQI), Precoding Matrix Indicator (PMI). A measurement may be absolute, relative to a common reference or to another measurement, a composite measurement (as described in U.S. Patent Application 61/678,462 filed on 2012-08-01, which is hereby incorporated by reference in its entirety), etc. A measurement may be on one link or more than one links (e.g., RSTD, timing advance, RTT, relative RSRP; measurements over multifarious links as described in PCT/SE2012/050644 filed on 2012-06-13, which is hereby incorporated by reference in its entirety, etc.). Measurements may also be differentiated by purpose and may be performed for one or more purposes (e.g., for one or more of: Radio Resource Management (RRM), MDT, SON, positioning, timing control or timing advance, synchronization). In a non-limited example, the various embodiments described herein may apply to any measurement such as described above.

As used herein, the term "radio measurement" may be used in a broader sense (e.g., receiving a channel (e.g., receiving system information via broadcast or multicast channel).

As used herein, the term requirements may comprise any type of UE requirements related to UE measurements (also known as measurement requirements, RRM requirements, mobility requirements, positioning measurement requirements, etc.). Examples of UE requirements related to UE measurements include, but are not limited to: measurement time, measurement reporting time or delay, measurement accuracy (e.g., RSRP/RSRQ accuracy), number of cells to be measured over the measurement time, etc. Examples of measurement time include, but are not limited to: L1 measurement period, cell identification time or cell search delay, CGI acquisition delay, etc.

In certain embodiments, SRS switching and SRS carrier-based switching may be used interchangeably to describe transmitting SRS on different carriers. SRS switching may be based on a time and/or frequency domain pattern. SRS switching may further involve SRS transmission types described above or other SRS transmission types. More example scenarios are described below.

Example Scenarios

Example Deployment Scenarios involving SRS Carrier Based Switching

An example of the basic scenario involves a UE being served by a first network node with a primary serving cell (e.g., PCell) operating on a first carrier frequency (f1). The UE is also capable of being served by at least one secondary serving cell (i.e., SCell) also known as a first SCell. The UE may be capable of being served by two or more SCells (e.g., the first SCell operates on a second carrier frequency (f2) and the second SCell operates on a third carrier frequency (f3)). The same applies for more than two SCells. The carrier f1 may be interchangeably referred to as PCC, while carriers f2, f3, . . . , f(n) may be interchangeably referred to as SCC1, SCC2, . . . , SCC(n−1) etc., respectively.

In one example, all f1, f2, and f3 belong to the licensed spectrum. Other combinations are also possible. In yet another example, the carriers f1 and f3 belong to a licensed spectrum or band, whereas f2 belongs to an unlicensed spectrum or frequency band. In an unlicensed spectrum or band, contention based transmission is allowed (i.e., two or more devices (e.g., UE or network nodes) can access even the same part of spectrum based on certain fairness constraints (e.g., LBT). In this case, no operator (or user or transmitter) owns the spectrum. In a licensed spectrum or licensed band, only contention free transmission is allowed (i.e., only devices (e.g., UE or network nodes) allowed by the owner of the spectrum license can access the licensed spectrum). In one example of the use case, all carriers can be in unlicensed spectrum, or in a license shared spectrum, or in a spectrum where LBT is required.

In one example, the CCs and the corresponding serving cells of a UE may be comprised all in the same node. In another example, at least two of them may be comprised in different nodes. The different nodes may be co-located or non-collocated.

In one example, all the CCs and the corresponding serving cells of a UE may be configured in the same timing advance group (TAG) (e.g., pTAG). In another example. some CCs and the corresponding serving cells of a UE may be configured in one Timing Advance Group, TAG, (e.g., pTAG) and the remaining CCs may be configured in another TAG (e.g., sTAG). In yet another example, the UE may be configured with 2 or more TAGs.

The above scenarios may also comprise DC or multi-connectivity operation performed based on corresponding CA configurations, where PSCell in different embodiments may be belong, for example, to a set of SCells.

Example SRS Switching Scenario

SRS switching (also known as "SRS switching" or "switching SRS transmissions" see on the term "SRS" above) may involve at least one of:

starting SRS transmission on a first carrier frequency and/or stopping SRS transmission on a second carrier frequency, wherein the first and the second carrier frequency may belong to licensed and/or unlicensed spectrum, the same RAT or different RATs. According to the earlier examples, the SRS carrier based switching may involve any one or more carriers of f1, f2, f3, . . . , f(n); and starting and/or stopping SRS transmission from one or more antennas or antenna ports.

In one example, SRS switching may comprise carrier based SRS switching and/or antenna based SRS switching.

The SRS switching may be controlled by the network and/or by the UE.

Although certain embodiments are described for carrier-based SRS switching, the present disclosure contemplates that the various embodiments described herein are applicable for any SRS switching type.

Switching among carriers and/or antennas during SRS switching may also cause some interruptions (e.g., to PCell or activated SCell), which may be due to UE reconfiguration such as configuring and/or activating target carriers (to which the SRS transmission is switched to), deconfiguring and/or deactivating source carriers (from which SRS transmission is switched), delays, reduced performance, etc.

Figure 5:
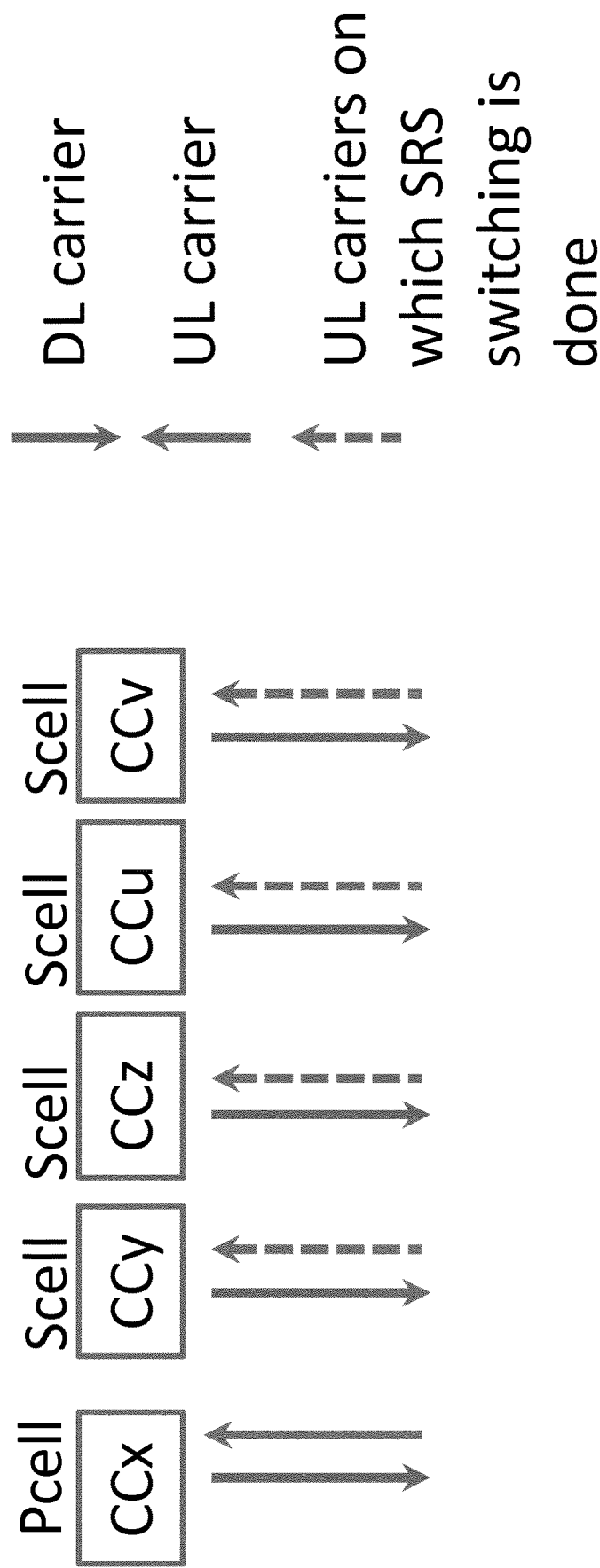
FIG. 5 illustrates an example configuration for SRS carrier-based switching, in accordance with certain embodiments.

FIG. 5 illustrates an example configuration for SRS carrier-based switching, in accordance with certain embodiments. More particularly, FIG. 5 illustrates an example configuration with 5DL CA and 2UL (or more UL) carrier aggregation for SRS carrier-based switching. The example of FIG. 5 illustrates a 5DL CA together with 2 UL CA, where one UL is fixed in the PCell and the SRS switching is done on one of the SCells (e.g., from SCell1 to SCell2). So, at any point of time, it's a 2UL CA combination. The same example scenario an also be shown with other numbers aggregated CCs in DL and UL, respectively. In some cases, the carriers (i.e., CCy, CCz, CCu and CCv) can be in different bands. For example, CCy can be in any band below 1 GHz, CCz can be in any band around 2 GHz and CCu can be any band in 3.5 GHz. In the example of FIG. 5, the CA combinations can be Time Division Duplex, TDD-TDD and/or Frequency Division Duplex, FDD-TDD.

In an unlicensed spectrum or band, the contention-based transmission is allowed (i.e., two or more devices (e.g., UE or network nodes) can access even the same part of spectrum based on certain fairness constraints (e.g., LBT). In this case, no operator (or user or transmitter) owns the spectrum. In a licensed spectrum or licensed band only contention free transmission is allowed (i.e., only devices (e.g., UE or network nodes) allowed by the owner of the spectrum license can access the licensed spectrum).

As used herein, the term "served" or "being served" means that the UE is configured with the corresponding serving cell and can receive from and/or transmit data to the network node on the serving cell (e.g., on PCell or any of the SCells). The data is transmitted or received via physical channels (e.g., PDSCH in DL, PUSCH in UL, etc.).

The UE may be requested to switch SRS transmission to one or more serving cells in any suitable manner. For example, in some cases the UE may be requested to switch SRS transmission to one or more serving cells by the network node. In some embodiments, one or more SRS switching messages or commands may be received by the UE via RRC signaling. In some embodiments, one or more SRS switching messages or commands may be received by the UE via Medium Access Control (MAC) Control Element (CE) command.

For example, the following signaling may apply:

Receiving a first serving cell SRS switching request message or command from a second network node for switching SRS carrier from the first serving cell;

Receiving a second serving cell SRS switching request message or command from a third network node for switching SRS carrier from the second serving cell;

Receiving a third serving cell SRS switching request message or command from a fourth network node for switching SRS carrier from the third serving cell.

In some embodiments, at least some of the first, second, third and fourth network nodes are the same or are co-located at the same site or location. For example, in such embodiments the UE may receive one or more messages or command for switching SRS carrier(s) from one or more serving cells from the first network node. Also for example in such embodiments the UE may receive one or more messages for SRS switching of one or more serving cells from the PCell.

In some embodiments, the any combination of the first, second, third and fourth network nodes are different and may be located at different sites or location or may be logically different nodes that may still be co-located. In such embodiments, the UE may receive one or more messages for SRS carrier switching from one or more serving cells from the respective serving cells.

Although the various embodiments described herein are described for at least one serving cell in unlicensed spectrum or in some cases for 2 serving cells with one on licensed and one on unlicensed spectrum or frequency bands), the present disclosure is not limited to these examples. Rather, the present disclosure contemplates that the various embodiments described herein are applicable to any suitable scenarios, including those involving any number of serving cells in which at least one serving cell operates on a CC belonging to an unlicensed spectrum or frequency band. The embodiments are also applicable for at least one or more serving cells in unlicensed spectrum where all involved serving cells are in unlicensed spectrum.

Methods in a UE

As described above, in certain embodiments a UE adapts its SRS carrier-based switching configuration and/or procedure when performing at least one measurement in order to avoid the impact of SRS switching (e.g., receiver/transmitter (re)configuration, interruptions, carrier switching, SRS (re)configuration, etc.) on certain time resources used for performing the measurements. The UE may further adapt the SRS carrier-based switching configuration in order to avoid the impact of SRS switching (e.g., receiver/transmitter (re)configuration, interruptions, carrier switching, SRS (re)configuration, etc.) on certain time resources used for signal/channel reception (e.g., broadcast channel, channel containing system information, etc.) or for signal/channel transmission (e.g., DMRS transmission, random access transmission, etc.).

In certain embodiments, methods in a UE are disclosed. According to one example embodiment, the method comprises the steps of:
  Step 1: Determining that the UE is to perform one or more radio measurements using a first set of reference time resources (R1) on at least a first cell (cell1) operating on a first carrier frequency (F1).
  Step 2: Adaptively performing SRS carrier-based switching for transmitting SRS on a second cell (cell2) operating on a second carrier frequency (F2) based on the determined first set of reference time resources (R1).

In certain embodiments, the UE may signal to another node (e.g., a network node or another UE) the first node's capability related to the UE's ability to adapt SRS switching in order to reduce, minimize or avoid interruption on critical signals used for performing measurements. The capability may be signaled in any suitable manner. For example, in certain embodiments the capability may be signaled upon a request from another node or upon a triggering condition or event or receiving a certain message from another node.

In certain embodiments, the UE may use a result of the adaptive SRS carrier-based switching for one or more operational tasks.

The various steps of the example embodiment are described in more detail below.

Step 1

In this step, the UE determines the need to perform at least one radio measurement (see the description of FIG. 4 above for measurement examples) on at least one cell operating on a first carrier frequency F1.

In one example, F1 may comprise a serving cell. F1 may be activated or deactivated, if configured for CA. In another example, F1 may be inter-frequency or inter-RAT carrier. The need for performing the measurement(s) may be based on any suitable criteria. For example, in certain embodiments the need for performing the measurement may be based on one or more of the following mechanism: periodicity of signals to be measured; Autonomous determination based on one or more conditions or criteria.
  Periodicity of signals to be measured:
    Measurement sample periodicity (e.g., it is known that for example for RLM measurements the UE needs samples at least from one subframe each radio frame);
    UE activity state configuration (e.g., non-Discontinuous Reception, non-DRX, or DRX or extended DRX (eDRX), DRX/eDRX cycle length, ON duration, etc.);
    Configuration of the radio measurement received from another node (e.g., a network node or another UE);
    A message or an indication, received from a higher layer in the UE or from another node (e.g., a network node or another UE), indicative of the need to perform the radio measurement;
    Event, condition, or a trigger according to which the radio measurement needs to be performed,
    A timer in the UE indicating that the radio measurement needs to be performed (e.g., for periodic or scheduled measurements).
  Autonomous determination based on one or more conditions or criteria. For example, performing a measurement on a cell (cell1) on F1 if the UE has lost or might lose synchronization with that cell.

The radio measurement(s) may be any one or more of the following: intra-frequency, inter-frequency, CA measurement, or inter-RAT measurement. The carrier frequency F1 may or may not be comprised in the set of carrier frequencies which are involved in the SRS switching. In a specific example, the radio measurement may be a DL measurement or a bidirectional measurement, or it may be a D2D measurement, Vehicle-to-Vehicle (V2V) measurement or a Vehicle-to-anything you can imagine (V2X) measurement. The V2V and V2X measurements are performed on signals transmitted by another UE on the sidelink.

In certain embodiments, the UE may determine a first set of time resources (R1) on cell1 of F1 in which the UE will perform the radio measurement. The determination may be based on any suitable criteria. For example, the determination may be based on pre-defined information (e.g., pre-defined requirements) or an indication received from the network node or from another UE. Examples of R1 include, but are not limited to:
  DL subframe #0 or DL subframe #5 containing reference signals (e.g., PSS, SSS, CRS, etc.). They are used for measurements like cell identification, RSRP, RSRQ, RS-SINR etc.
  DL subframes containing CSI-RS, which are used for doing CSI-RSRP measurement.
  DL subframes containing positioning reference signal (PRS), which are used for OTDOA (RSTD (Reference Signal Time Difference) measurement. They may also be referred to as PRS subframes.
  DL subframes containing CRS or NRS, which are used for radio link monitoring (e.g., out of sync and in sync detection).
  DL subframe #0 and DL subframe #5 containing PBCH and SIB1 (on PDSCH) respectively, and are used for acquiring the SI of the cell.
  DL subframes containing DRS (discovery signals), which are used for doing discovery signal measurements.
  UL subframes containing SRS used for timing measurements (e.g., UE Rx-Tx time difference).

The UE may further determine a second set of time resources (R2) used for doing another measurement on another cell (e.g., cell3) on F1. Examples of R2 are the same as described above for R1.

In some cases, Cell1 may be a serving cell or a neighbor cell. Cell3 may be a neighbor cell. The set of R1 and R2 may or may not be aligned in time.

In certain embodiments, the UE may further determine that it may receive one or more channels or physical signals in one or more time resources on cell1 (e.g., broadcast channel in subframe #0). The UE may further determine that it may transmit one or more channels or physical signals in one or more time resources on cell1 (e.g., DMRS in subframe 1, random access in subframe 4 every second frame). The UE may determine this in any suitable manner, for example based on an indication received from its higher layer or a request from another node (e.g., network node or another UE).

Step 2

In this step, the UE adaptively performs SRS carrier-based switching on a second carrier (F2) for transmitting SRS on a second cell (cell2) of F2. In certain embodiments, the adaptation of the SRS switching is based on at least the determined first set of time resources (R1) used or expected to be used by the UE for at least doing measurement(s) on at least one cell on F1. The adaptation of the SRS switching may further be based on a second set of time resources (R2) used or expected to be used by the UE for at least doing measurement(s) on another cell on F1. The adaptation of the SRS switching may further be based on yet another set of time resources used or expected to be used by the UE for doing measurement(s) on another set of one or more cells on F2. The adaptation of the SRS switching may further be based on another set of time resources (e.g., R3) used or expected to be used by the UE for doing measurement(s) on one or more cells on another carrier (F3).

The exemplary time resources, R1, R2 and R3 may be related to each other according to any of the following principles; these examples apply to any combination or sets of time resources:

- In one example, two or three of R1, R2, and R3 are non-overlapping;
- In another example, two or three of R1, R2, and R3 are separated by at least time T1 or by at least n time resources (e.g., 1 subframe);
- In another example R1, R2 and R3 may be different time resources (e.g., R1, R2 and R3 may correspond to subframe #0, subframe #2 and subframe 9, respectively);
- In another example R1, R2 and R3 may be the same time resources (e.g., R1, R2 and R3 may correspond to both subframe #0 and subframe #5).
- In yet another example R1, R2 and R3 may be time aligned (e.g., subframes belonging to R1, R2 and R3 may have the same starting item (i.e., subframe aligned in time)).
- In yet another example R1, R2 and R3 may not be time aligned (e.g., subframes belonging to R1, R2 and R3 may have the same starting item (i.e., subframe aligned in time)).

In yet another example, any combination of examples may apply. For example, any combination of examples #1, 2, 3 and 4 (i.e., the first four examples listed above) may apply.

SRS carrier based switching configuration may comprise, for example, one or more of:

- SRS switching period (i.e., time after which the UE switch to another carrier to transmit SRS);
- Number or a set of carrier involved in SRS carrier based switching;
- Sequence in which the carriers are switched;
- SRS switching loop length (e.g., the time to the next transmission on the same carrier);
- SRS transmission configuration (see e.g., SRS transmission parameters described above in the background);
- Time-to-stay on the carrier during SRS carrier based switching;
- Minimum or maximum time before SRS transmission on f2/f3 when the UE switches to f2/f3; and
- Minimum or maximum time after SRS transmission on f2/f3 when the UE switches from f2/f3.

The UE may adapt any one or more of the SRS carrier based switching configuration parameters above.

The SRS carrier based switching for transmitting SRS on F2 may be performed by any of the following means:

- By not transmitting any uplink signal on a carrier where measurement is or expected to be performed at least during the time period over which the UE transmits SRS on F2 (i.e., using transmitter circuitry (e.g., transmitter chain) of that carrier (on which measurement is to be done) for transmitting SRS on F2). More specifically for example:
  - By not transmitting any uplink signal on F1 at least during the time period over which the UE transmits SRS on F2 i.e. using transmitter circuitry (e.g., transmitter chain) of F1 for transmitting SRS on F2.
  - By not transmitting any uplink signal on another carrier F3 at least during the time period over which the UE transmits SRS on F2 (i.e., using transmitter circuitry (e.g., transmitter chain) of F3 for transmitting SRS on F2).
- By not transmitting any uplink signal on a carrier where measurement is not performed or is not expected to be performed at least during the time period over which the UE transmits SRS on F2 (i.e., using transmitter circuitry (e.g., transmitter chain) of that carrier (on which measurement is not to be done) for transmitting SRS on F2. More specifically, for example:
  - By not transmitting any uplink signal on another carrier F4 at least during the time period over which the UE transmits SRS on F2 (i.e., using transmitter circuitry (e.g., transmitter chain) of F4 for transmitting SRS on F2).

The UE determines the need to perform SRS carrier based switching on F2 based one or more of the following mechanisms:

- UE activity state (e.g., SRS switching only in non-DRX state or short DRX state, but not in eDRX or not in DRX);
- SRS switching type;
- SRS switching configuration;
- A message or an indication, indicative of the need to perform the SRS carrier based switching, received from a higher layer in the first node or from another node (e.g., a network node or another UE);
- Event, condition, or a trigger according to which the SRS carrier based switching needs to be performed;
- A timer in the first node indicating that the SRS carrier based switching needs to be performed (e.g., for periodic or scheduled measurements);
- A time- and/or frequency-domain pattern controlling when the SRS carrier based switching is to be performed and which frequency resources (e.g., carriers) are involved;
- SRS (re)configuration for the SRS transmissions to start in relation to the SRS carrier based switching; and
- SRS (re)configuration for the SRS transmissions to stop in relation to the SRS carrier based switching.

The adaptation of the SRS carrier-based switching for transmitting SRS on cell2 belonging to F2 may be performed by the UE based on one or more of the following mechanisms: autonomously, based on a pre-defined rule or using a pre-defined configuration, or based on the assistance data from another node (e.g., from a network node or from another UE). The adaptation of the SRS carrier based switching which takes into account the impact of the SRS carrier based switching on one or more radio measurements on F1 may further comprise of one or more of the following aspects:

- Causing no interruption on cell1 of F1 during R1.
- Causing no interruption on cell1 of F1 during R1 in which the UE actually performs the measurement.
- Ensuring that the interruption on cell1 does not occur in R1 more than X % of the time, etc.
- Causing no interruption on cell during R1 such that UE meets a first set of requirements (M1) of cells on F1 when doing measurements during R1.
- Limiting the interruption on cell1 during R1 such that UE meets a second set of requirements (M2) of cells on F1; M2 is less stringent than M1. For example measurement period (T1) over which the measurement is performed belonging to M1 is shorter than the measurement period (T2) belonging to M2 (i.e., T2>T1). For example T1 and T2 can be 200 ms and 800 ms, respectively.

Performing the measurement so that the impact of the SRS carrier based switching is reduced, minimized or avoided.

Avoiding performing the measurement in the resources impacted by the SRS carrier based switching.

Dropping the measurement (e.g., when the amount of impact exceeds a threshold e.g., more than N subframes or measurement samples or more than X % of measurement subframes or measurement samples are impacted).

Postponing the measurement (e.g., starting the measurement after the SRS carrier switching when there is no impact on the measurement).

Extending the measurement period beyond a certain reference value to compensate for the avoided time resources during the measurement. For example, the reference value of measurement period can be the measurement period of the measurement when no SRS switching is performed by the UE.

Extending the measurement period in order to maintain the same measurement accuracy when the SRS carrier based switching occurs during the measurement period.

Selectively using measurement samples to compose the measurement (e.g., excluding the samples impacted by the SRS carrier based switching or ensuring that at most Y % of samples used for the measurement may be impacted by the SRS carrier-based switching).

Adapting the sample combining method (e.g., averaging over a different set of symbols within a subframe to reduce the impact where the different set of symbols may be larger compared to when no impact is expected).

Using a filter configuration for measurement samples or measurement instances that may be impacted by the SRS carrier based switching, wherein the filter configuration is different from what is used in the case of no SRS carrier based switching.

Adapting the measurement bandwidth (e.g., a larger bandwidth to compensate for a fewer samples available for the measurement due to the impact of the SRS carrier based switching).

Selecting the signal or channel types for performing the measurement (e.g., the measurement may be performed on physical signals of a first type when no impact from SRS carrier based switching is expected while the measurement may be performed on physical signals of a second type when the impact of SRS carrier based switching needs to be accounted for).

Adapting the set of receive antennas or antenna ports (e.g., a first set of receive antennas is used for the measurement when no SRS carrier based switching impacted needs to be accounted, otherwise a second set of receive antennas is used).

Adapting the number of redundancy versions of a channel transmission to be received and/or combined for receiving data via the channel (e.g., system information).

Adapting the SRS carrier based switching to ensure that at least certain number of time resources are available during certain time period at the UE for performing the measurement. This rule is further described by the following examples:

Adapting SRS carrier based switching to ensure that at least N1 number of time resources are available per time period (T1) at the UE in the serving cell for radio link monitoring. According to a pre-defined rule the UE meets pre-defined requirements (e.g., RLM, out of sync and in sync) provided that at least N1 number of time resources are available per T1 at the UE in the serving cell for RLM. Examples of N1 and T1 are 1 subframe and radio frame, respectively.

Adapting SRS carrier based switching to ensure that at least N2 number of time resources are available per time period (T2) at the UE in the measured cell for doing radio measurement (e.g., RSRP, RSRQ, RS-SINR etc.), According to a pre-defined rule the UE meets pre-defined requirements (e.g., RSRP) provided that at least N2 number of time resources are available per T2 at the UE in the serving cell for RLM. Examples of N2 and T2 are 1 subframe and radio frame respectively.

Adapting SRS carrier based switching to ensure that at least N3 number of specific type of time resources are available per time period (T3) at the UE in the measured cell for doing radio measurement e.g. cell search, CGI acquisition, etc. According to a pre-defined rule the UE meets pre-defined requirements (e.g., cell identification delay) provided that at least one of the subframe #0 and subframe #5 are available per T3 at the UE in the cell to be identified. Example of T3 is radio frame.

The UE may trigger the adaptation of the SRS carrier based switching based on one or more of the following:
pre-defined rule e.g. always adapt to avoid interruption on resources used for measurements.
pre-defined requirements i.e. to ensure that the UE meets the requirements related to measurements.
Indication or configuration received from a node e.g. from the serving network node, As described above, in certain embodiments the UE may use a result of the adaptive SRS carrier-based switching for one or more operational tasks. Examples of the operational tasks include, but are not limited to:
Informing another node (e.g., network node) that the adaptation of the SRS carrier based switching is performed by the UE;
Informing another node (e.g., network node) that the adaptation of the SRS carrier based switching is performed to avoid the impact on measurements on specific carrier frequencies (e.g., F1);
Reporting the results of the radio measurement another node (e.g., a network node or another UE);
Using the measurement results for one or more operations (e.g., for positioning, power control, link adaptation);
Performing the measurement while meeting a pre-defined requirement (e.g., measurement time, measurement accuracy, number of correctly received messages, etc.);
Any other suitable operational task.

Methods in a Network Node

In certain embodiments, methods in a network node are disclosed. According to one example embodiment, the method comprises the steps of:
See also corresponding embodiments for the UE.
A method in a network node comprising the steps of:
Step 1: Determining that a UE is to perform one or more radio measurements using a first set of reference time resources (R1) on at least a first cell (cell1) operating on a first carrier frequency (F1).
Step 2: Determining that the UE is to adaptively perform SRS carrier-based switching for transmitting SRS on a second cell (cell2) operating on a second carrier frequency (F2) based on the determined first set of reference time resources (R1).
Step 3: Using a result of the adaptive SRS carrier-based switching for one or more operational tasks.

In certain embodiments, the network node may obtain the UE's capability related to its ability to adapt SRS carrier based switching to minimize, avoid, or reduce the impact of SRS switching on the UE measurement procedure. The network node may obtain the UE's capability based on, for example, receiving a message from the UE or another node, monitoring UE behavior, etc.

The various steps of the example embodiment are described in more detail below. Additional information is included in the description of the methods in a UE described above.

Step 1

In this step, the network node determines that the UE is to perform one or more radio measurements using a first set of reference time resources (R1) on at least a first cell (cell1) operating on a first carrier frequency (F1). The determination may be based on any suitable criteria. For example, in certain embodiments the determination can be based on the measurement configuration transmitted by the network node to the UE, UE activity state configuration, etc. See also above for further examples.

Step 2

In this step, the network node determines that the UE is to adaptively perform SRS carrier-based switching for transmitting SRS on a second cell (cell2) operating on a second carrier frequency (F2) based on the determined first set of reference time resources (R1). The determination may be based on any suitable criteria.

For example, in certain embodiments the determination may be based on one or more of the following:
  SRS switching configuration (see for example above);
  UE's capability to adapt SRS carrier based switching to avoid or minimize the interruption on resources used for doing measurements;
  Type of measurement performed by the UE while the UE performs SRS switching;
  Pre-defined rule (e.g., UE adaptively performs SRS carrier-based switching when performing a measurement on a carrier);
  Based on a configuration sent to the UE (e.g., request for adapting the SRS based carrier switching while performing the measurement).

In another aspect of this embodiment, the network node, upon determining that the UE is to perform a radio measurement on a cell of F1, may configure the UE to adaptively perform the SRS based carrier switching while performing said measurement.

Step 3

In this step, the network node uses one or more results of the adaptive SRS carrier-based switching for one or more operational tasks. Examples of adaptation include, but are not limited to:
  Adapting the measurement configuration and transmitting the adapted measurement configuration to the UE,
  Reconfiguring cell parameters e.g. transmission power etc,
  Adapting scheduling of signals in the uplink and/or in the downlink,
  Changing the sets of or swapping carrier frequencies of PCell, PSCell and/or SCells of the UE,
  Adapting SRS configuration e.g. periodicity and/or bandwidth of the SRS Proposed changes to the standard The excerpts below include potential changes to 3GPP TS 36.133 v14.1.0:

7.6 Radio Link Monitoring 7.6.1 Introduction

The UE shall meet the radio link monitoring requirements specified for PSCell in section 7.6 provided that the UE is configured with the parameters T313, N313 and N314 defined in [2]. The UE shall monitor the downlink link quality based on the cell-specific reference signal in order to detect the downlink radio link quality of the PCell and PSCell as specified in [3]. The UE shall estimate the downlink radio link quality and compare it to the thresholds $Q_{out}$ and $Q_{in}$ for the purpose of monitoring downlink radio link quality of the PCell and PSCell. The threshold $Q_{out}$ is defined as the level at which the downlink radio link cannot be reliably received and shall correspond to 10% block error rate of a hypothetical PDCCH transmission taking into account the PCFICH errors with transmission parameters specified in Table 7.6.1-1.

The threshold $Q_{in}$ is defined as the level at which the downlink radio link quality can be significantly more reliably received than at $Q_{out}$ and shall correspond to 2% block error rate of a hypothetical PDCCH transmission taking into account the PCFICH errors with transmission parameters specified in Table 7.6.1-2.

When higher-layer signalling indicates certain subframes for restricted radio link monitoring, the radio link quality shall be monitored as specified in [3].

The requirements in sections 7.6.2.1, 7.6.2.2 and 7.6.2.3 shall also apply when a time domain measurement resource restriction pattern for performing radio link monitoring measurements is configured by higher layers (TS 36.331 [2]), with or without CRS assistance information, provided that also the following additional condition is fulfilled:
  The time domain measurement resource restriction pattern configured for the measured cell indicates at least one subframe per radio frame for performing the radio link monitoring measurements,
  When the CRS assistance information is provided, the transmission bandwidth [30] in all intra-frequency cells in the CRS assistance information [2] is the same or larger than the transmission bandwidth of the PCell for which radio link monitoring is performed.

When the CRS assistance information is provided, the requirements in Section 7.6 shall also be met when the number of transmit antenna ports [16] of one or more cells whose CRS assistance information is provided [21] is different from the number of transmit antenna ports of the cell for which radio link monitoring is performed.

NOTE: If the UE is not provided with the CRS assistance information (TS 36.331 [2]) or the CRS assistance data is not valid throughout the entire evaluation period, then similar Release 8 and 9 requirements apply for time domain measurements restriction under colliding CRS with ABS configured in non-MBSFN subframes.

The UE capable of SRS carrier based switching when configured to perform SRS carrier based switching shall perform radio link monitoring and meet the requirements defined in Section 7.6 provided the following condition is met:
  at least one downlink subframe is available for doing radio link monitoring at the UE in the PCell.

8.1.2.7 E-UTRAN E-CID Measurements 8.1.2.7.1 E-UTRAN FDD UE Rx-Tx Time Difference Measurements When no DRX is used the physical layer measurement period of the UE Rx-Tx time difference measurement shall be 200 ms.

When DRX is used in RRC_CONNECTED state the physical layer measurement period ($T_{measure\_FDD\_UE\_Rx\_Tx1}$) of the UE Rx-Tx time difference measurement shall be as specified in table 8.1.2.7.1-1. When eDRX_CONN is used in RRC_CONNECTED state, the physical layer measurement period ($T_{measure\_FDD\_UE\_Rx\_Tx1}$) of the UE Rx-Tx time difference measurement shall be as specified in table 8.1.2.7.1-2.

TABLE 8.1.2.7.1-1

FDD UE Rx-Tx time difference measurement requirement when DRX is used

| DRX cycle length (s) | $T_{measure\_FDD\_UE\_Rx\_Tx1}$ (s) (DRX cycles) |
|---|---|
| ≤0.04 | 0.2 (Note1) |
| 0.04 < DRX-cycle ≤ 2.56 | Note2 (5) |

Note1:
Number of DRX cycle depends upon the DRX cycle in use
Note2:
Time depends upon the DRX cycle in use

TABLE 8.1.2.7.1-2

FDD UE Rx-Tx time difference measurement requirement when eDRX_CONN is used

| eDRX_CONN cycle length (s) | $T_{measure\_FDD\_UE\_Rx\_Tx1}$ (s) (eDRX_CONN cycles) |
|---|---|
| 2.56 < eDRX_CONN cycle ≤ 10.24 | Note (5) |

Note:
Time depends upon the eDRX_CONN cycle in use

If the UE is performing UE Rx-Tx time difference measurement while the PCell is changed due to the handover then the UE shall restart the Rx-Tx measurement on the new cell. In this case the UE shall also meet the UE Rx-Tx time difference measurement and accuracy requirements. However the physical layer measurement period of the UE Rx-Tx measurement shall not exceed $T_{measure\_FDD\_UE\_Rx\_Tx3}$ as defined in the following expression:

$$T_{measure\_FDD\_UE\_Rx\_Tx3} = (K+1)*(T_{measure\_FDD\_UE\_Rx\_Tx1}) + K*T_{PCell\_change\_handover}$$

Where:
K is the number of times the PCell is changed over the measurement period ($T_{measure\_FDD\_UE\_Rx\_Tx3}$),
$T_{PCell\_change\_handover}$ is the time necessary to change the PCell due to handover; it can be up to 45 ms.

If the UE supporting E-UTRA carrier aggregation when configured with the secondary component carrier(s) is performing UE Rx-Tx time difference measurement while the PCell is changed regardless whether the primary component carrier is changed or not then the UE shall restart the Rx-Tx measurement on the new PCell. In this case the UE shall also meet the UE Rx-Tx time difference measurement and accuracy requirements corresponding to the new PCell. However the physical layer measurement period of the UE Rx-Tx measurement shall not exceed $T_{measure\_FDD\_UE\_Rx\_Tx2}$ as defined in the following expression:

$$T_{measure\_FDD\_UE\_Rx\_Tx2} = (N+1)*(T_{measure\_FDD\_UE\_Rx\_Tx1}) + N*T_{PCell\_change\_CA}$$

Where:
N is the number of times the PCell is changed over the measurement period ($T_{measure\_FDD\_UE\_Rx\_Tx2}$),
$T_{PCell\_change\_CA}$ is the time necessary to change the PCell; it can be up to 25 ms.

If IDC autonomous denial is configured then the UE shall also meet the requirements, provided not more than 30 IDC autonomous denial suframes are configured over an IDC autonomous denial validity period of at least 200 ms.

The UE capable of SRS carrier based switching when configured to perform SRS carrier based switching shall perform radio link monitoring and meet the requirements defined in Section 8.1.2.7 rovided the following condition is met:

at least one downlink subframe and one uplink subframe are available for doing UE Rx-Tx time difference measurement at the UE in the PCell.

The measurement accuracy for the UE Rx-Tx time difference measurement when DRX or eDRX_CONN is used as well as when no DRX is used shall be as specified in the sub-clause 9.1.9.

8.3 Measurements for E-UTRA Carrier Aggregation
8.3.1 Introduction

Requirements in this clause are applicable to UE supporting E-UTRA FDD, E-UTRA TDD and/or E-UTRA TDD-FDD carrier aggregation.

Non configured frequencies may be measured with measurement gaps or autonomous gaps according to the requirements in clause 8.1.2.3 (E-UTRAN inter frequency measurements and E-UTRAN inter frequency measurements with autonomous gaps).

For UE, which does not support simultaneous reception and transmission for inter-band TDD CA specified in TS 36.331, and is compliant to the requirements for inter-band CA with uplink in one E-UTRA band and without simultaneous Rx/Tx specified in TS 36.101, the inter-band CA requirements in Section 8.3 shall apply also with different TDD UL/DL subframe configurations and/or different special subframe configurations used in CCs of different bands, under the following additional conditions:

UE is not simultaneously scheduled in UL and DL on the different CCs, and at least DL subframe #0 or DL subframe #5 are available for measurements in the measured cell.

The UE capable of SRS carrier based switching when configured to perform SRS carrier based switching shall meet the requirements defined in Section 8.3 provided the following condition is met:

at least DL subframe #0 or DL subframe #5 per radio frame is available for measurements at the UE in the measurement cell.

8.4 OTDOA RSTD Measurements for E-UTRAN Carrier Aggregation
8.4.1 Introduction

This clause contains RSTD measurement requirements on UE capabilities for support of E-UTRA carrier aggregation. Requirements in this clause are applicable to all carrier aggregation capable UE which have been configured with one or two downlink Scell(s). Non-configured frequencies may be measured with measurement gaps according to the requirements in clause 8.1.2.6, i.e., E-UTRAN inter-frequency RSTD measurement period applies. Requirements in this clause are applicable for E-UTRA FDD, E-UTRA TDD and E-UTRA TDD-FDD carrier aggregation.

For UE, which does not support simultaneous reception and transmission for inter-band TDD CA specified in TS 36.331 [2], and is compliant to the requirements for inter-band CA with uplink in one E-UTRA band and without simultaneous Rx/Tx specified in TS 36.101 [5], RSTD requirements in Section 8.4 shall apply also with different TDD UL/DL subframe configurations and/or different special subframe configurations used in CCs of different bands, under the following additional conditions:

all positioning subframes indicated in the OTDOA assistance data and specified in Section 9.1.10 are available for RSTD measurements in the measured and reference cells; and UE is not simultaneously scheduled in UL and DL on the different CCs.

The UE capable of SRS carrier based switching when configured to perform SRS carrier based switching shall meet the requirements defined in Section 8.4 provided the following condition is met:

all positioning subframes indicated in the OTDOA assistance data and specified in Section 9.1.10 are available for RSTD measurements at the UE in the measured and reference cells 8.4.3 Measurements on a Secondary Component Carrier The RSTD measurements when all cells are on a configured secondary component carrier shall meet all applicable requirements (FDD or TDD) specified in clause 8.1.2.5, i.e., E-UTRAN intra-frequency RSTD measurement period applies, regardless of whether the Scell on the corresponding frequency is activated or deactivated by the MAC-CE commands as specified in [17].

The RSTD measurement accuracy for all the measurements on the secondary component carrier shall be fulfilled according to the accuracy as specified in the sub-clause 9.1.12.

A UE may reconfigure receiver bandwidth taking into account the SCell activation/deactivation status, SRS carrier based switching, and when making RSTD measurements on cells belonging to SCC with deactivated SCell. This may cause interruptions (packet drops) to a PCell when the PCell and the SCell belong to the adjacent or non-adjacent component carriers in the same frequency band or to different frequency bands. In this case, the UE shall follow the interruption requirements specified in Section 7.10. No interruption to the PCell shall be allowed during the PRS positioning occasion on the PCell.

8.8 Measurements for E-UTRA Dual Connectivity 8.8.1 Introduction

This clause contains requirements for UE supporting E-UTRA dual connectivity. Requirements in this clause are applicable to UEs which have been configured with one SCell in either MCG (Multi-cell/multicast Coordination Entity) or SCG (Secondary Cell Group) and one PSCell for inter-band dual connectivity. Requirements in this clause are applicable to E-UTRA FDD, E-UTRA TDD and E-UTRA TDD-FDD dual connectivity.

The UE capable of SRS carrier based switching when configured to perform SRS carrier based switching shall meet the requirements defined in Section 8.8 provided the following condition is met:

at least DL subframe #0 or DL subframe #5 per radio frame is available for measurements at the UE in the measurement cell.

8.12 Discovery Signal Measurements for E-UTRA Carrier Aggregation under Operation with Frame Structure 3

8.12.1 Introduction

This section contains requirements on UE capabilities for support of E-UTRA carrier aggregation under operation with frame structure 3.

Non configured frequencies may be measured with measurement gaps according to the requirements in Section 8.11.2.2 and Section 8.11.3.2.

The requirements in Section 8.12 shall apply for E-UTRA carrier aggregation of one FDD PCell or one TDD PCell and SCell on one SCC, where the SCC is following the frame structure type 3 [16].

8.12.2 CRS Based Discovery Signal Measurements for E-UTRA Carrier Aggregation 8.12.2.1 Introduction The requirements in Section 8.12.2 shall apply for CRS based discovery signal measurements comprising RSRP and RSRQ (Reference Signal Received Quality) measurements [4].

The UE capable of SRS carrier based switching when configured to perform SRS carrier based switching shall meet the requirements defined in Section 8.12.2 provided the following condition is met:

minimum number of configured discovery signal occasions containing CRS based discovery signal as specified in section 8.12.2 is available for measurements at the UE in the measurement cell.

8.12.3 Requirements for CSI-RS Based Discovery Signal Measurements for E-UTRA Carrier Aggregation 8.12.3.1 Introduction The requirements in Section 8.12.3 shall apply for CSI-RS based discovery signal measurements comprising CSI-RSRP measurements [4].

The UE capable of SRS carrier based switching when configured to perform SRS carrier based switching shall meet the requirements defined in Section 8.12.3 provided the following condition is met:

minimum number of configured discovery signal occasions containing CSI-RS based discovery signal as specified in section 8.12.3 is available for measurements at the UE in the measurement cell.

Figure 6:
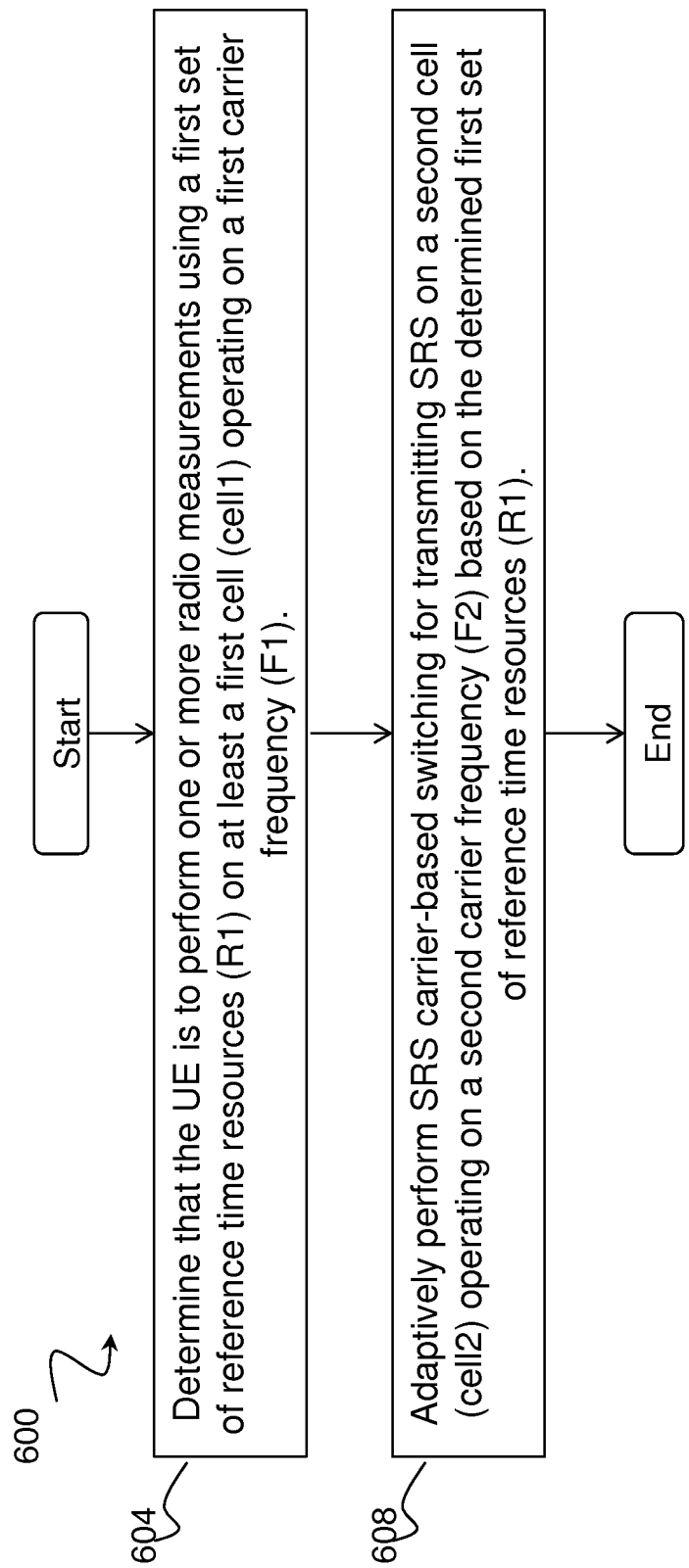
FIG. 6 is a flow diagram of a method in a user equipment, in accordance with certain embodiments.

FIG. 6 is a flow diagram of a method in a user equipment, in accordance with certain embodiments. The method begins at step 604, where the UE determines that the UE is to perform one or more radio measurements using a first set of reference time resources (R1) on at least a first cell (cell1) operating on a first carrier frequency (F1). In certain embodiments, the UE may signal to another node (e.g., a network node or another UE), a capability related to the UE's ability to adapt SRS switching in order to reduce, minimize or avoid interruption on critical signals used for performing measurements.

At step 608, the UE adaptively performs SRS carrier-based switching for transmitting SRS on a second cell (cell2) operating on a second carrier frequency (F2) based on the determined first set of reference time resources (R1). In certain embodiments, the UE may use one or more results of the adaptive SRS carrier-based switching for one or more operational tasks.

Figure 7:
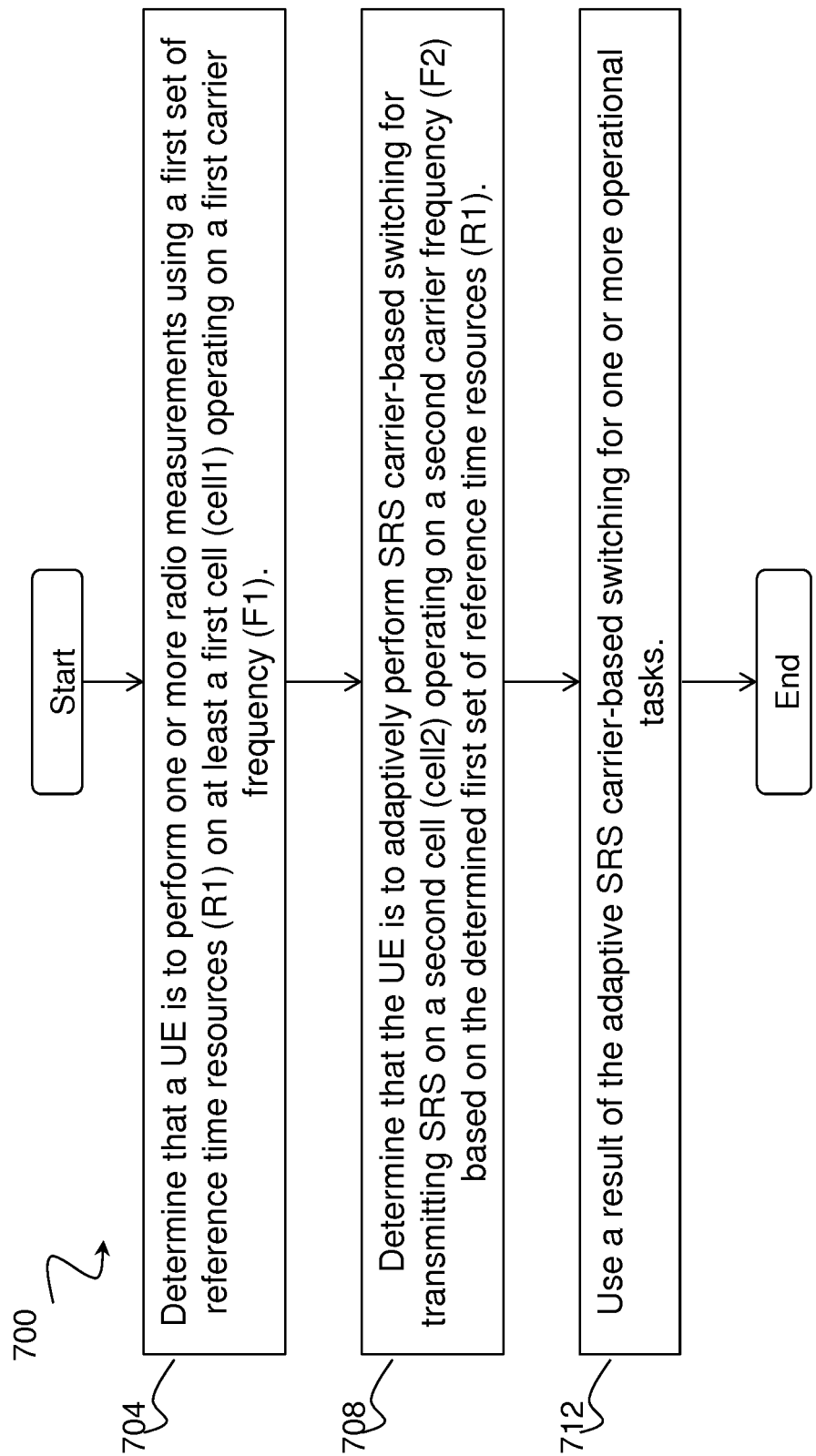
FIG. 7 is a flow diagram of a method in a network node, in accordance with certain embodiments.

FIG. 7 is a flow diagram of a method in a network node, in accordance with certain embodiments. The method begins at step 704, where the network node determines that a UE is to perform one or more radio measurements using a first set of reference time resources (R1) on at least a first cell (cell1) operating on a first carrier frequency (F1). In certain embodiments, the network node may obtain the UE's capability related to its ability to adapt SRS carrier-based switching to minimize, avoid, or reduce the impact of SRS switching on the UE measurement procedure.

At step 708, the network node determines that the UE is to adaptively perform SRS carrier-based switching for transmitting SRS on a second cell (cell2) operating on a second carrier frequency (F2) based on the determined first set of reference time resources (R1).

At step 712, the network node uses a result of the adaptive SRS carrier-based switching for one or more operational tasks.

Figure 8:
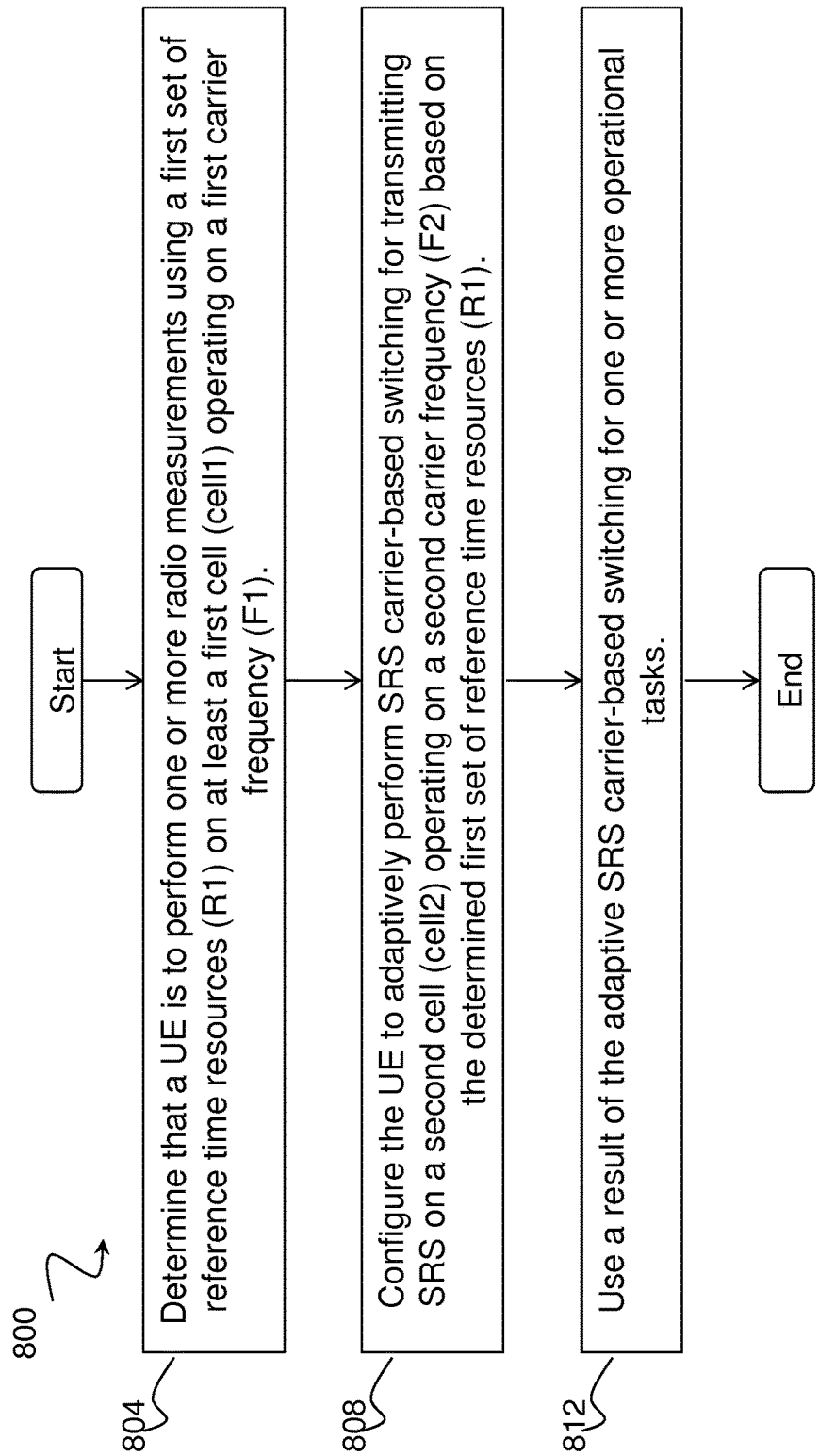
FIG. 8 is a flow diagram of a method in a network node, in accordance with certain embodiments.

FIG. 8 is a flow diagram of a method in a network node, in accordance with certain embodiments. The method begins at step 804, where the network node determines that a UE is to perform one or more radio measurements using a first set of reference time resources (R1) on at least a first cell (cell1) operating on a first carrier frequency (F1). In certain embodiments, the network node may obtain the UE's capability related to its ability to adapt SRS carrier-based switching to minimize, avoid, or reduce the impact of SRS switching on the UE measurement procedure.

At step 808, the network node configures the UE to adaptively perform SRS carrier-based switching for transmitting SRS on a second cell (cell2) operating on a second carrier frequency (F2) based on the determined first set of reference time resources (R1).

At step 812, the network node uses a result of the adaptive SRS carrier-based switching for one or more operational tasks.

Figure 9:
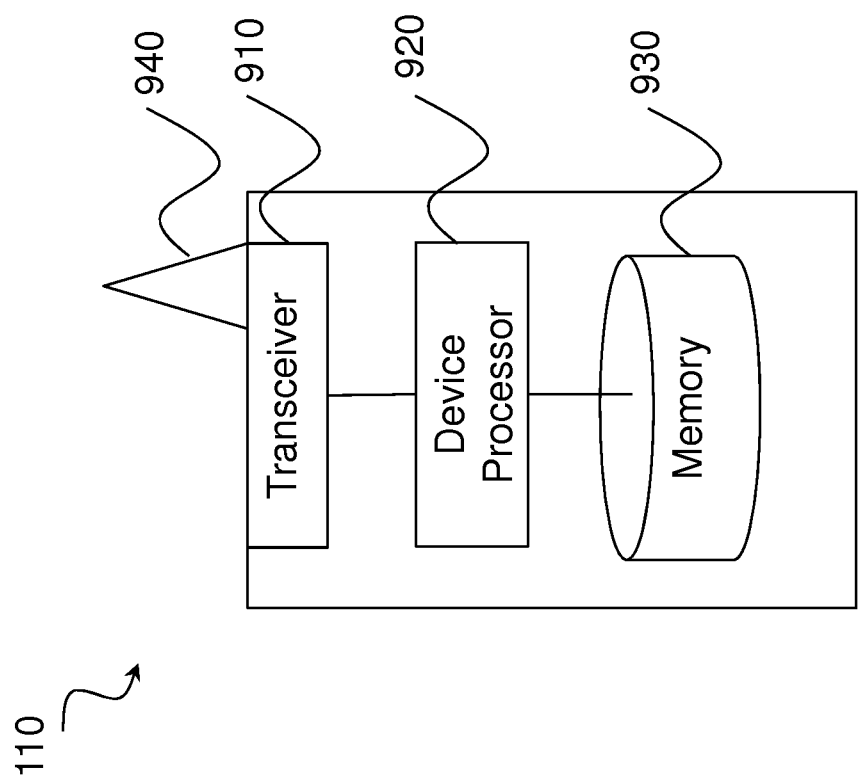
FIG. 9 is a block schematic of an exemplary wireless device, in accordance with certain embodiments.

FIG. 9 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via antenna 940), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110, such as the functions of wireless device 110 described above in relation to FIGS. 1-8. In some embodiments, processor 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
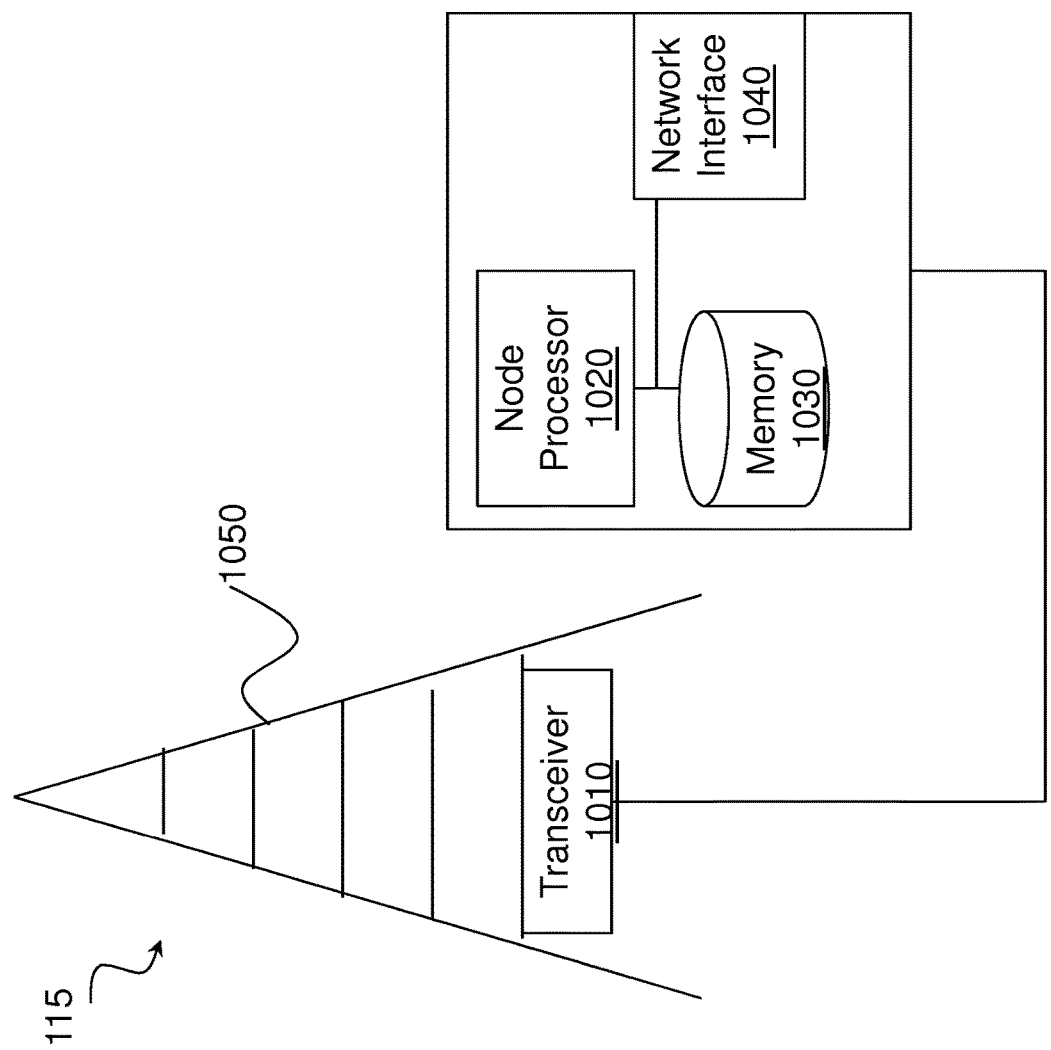
FIG. 10 is a block schematic of an exemplary network node, in accordance with certain embodiments.

FIG. 10 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via antenna 1050), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes or radio network controllers 130, etc.

Processor 1020 may include any suitable combination of hardware and software implemented in one or more modules to execute instructions and manipulate data to perform some or all of the described functions of network node 115, such as those described above in relation to FIGS. 1-8 above. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
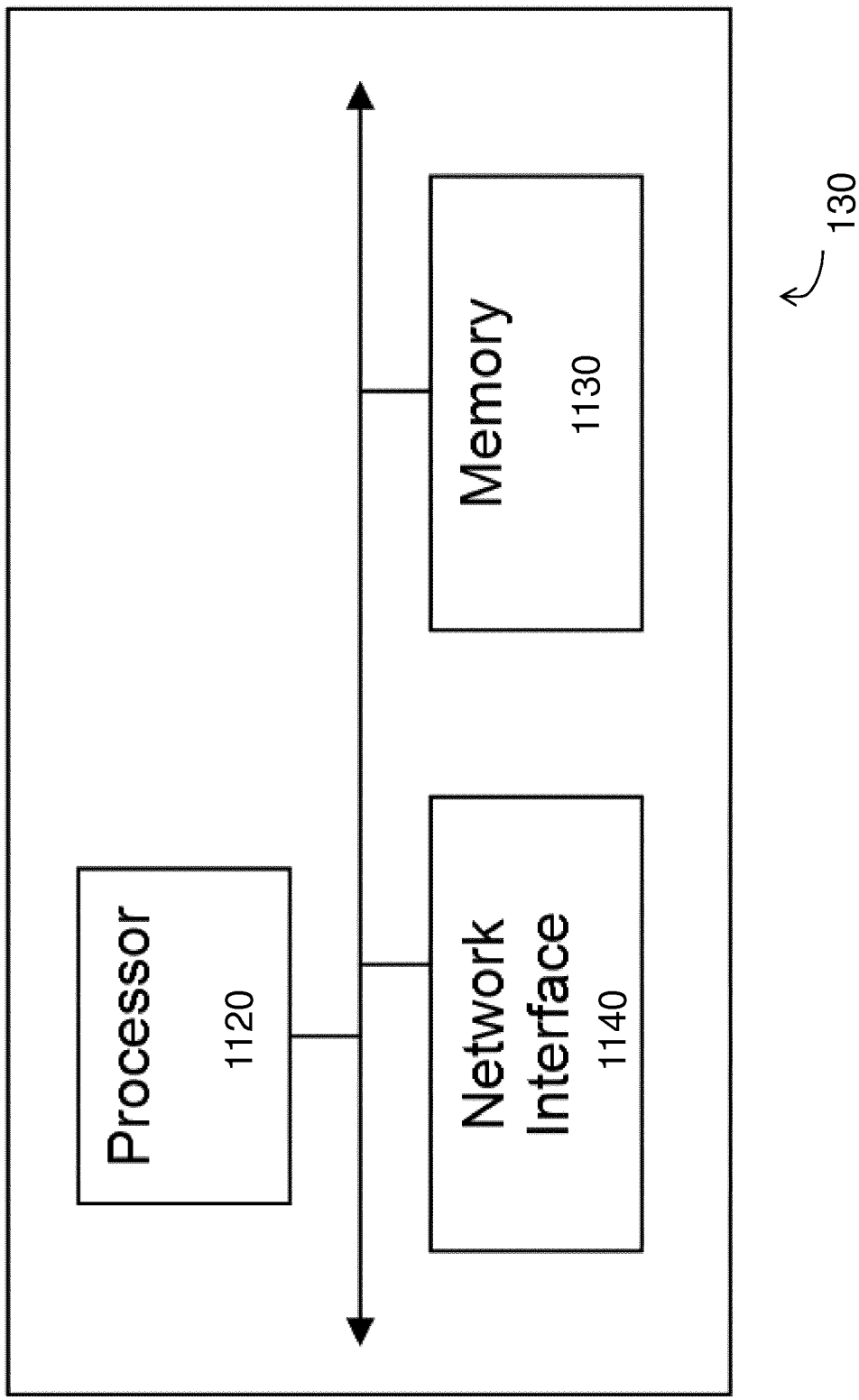
FIG. 11 is a block schematic of an exemplary radio network controller or core network node, in accordance with certain embodiments.

FIG. 11 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes 130, etc.

Processor 1120 may include any suitable combination of hardware and software implemented in one or more modules to execute instructions and manipulate data to perform some or all of the described functions of the radio network controller or core network node 130. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
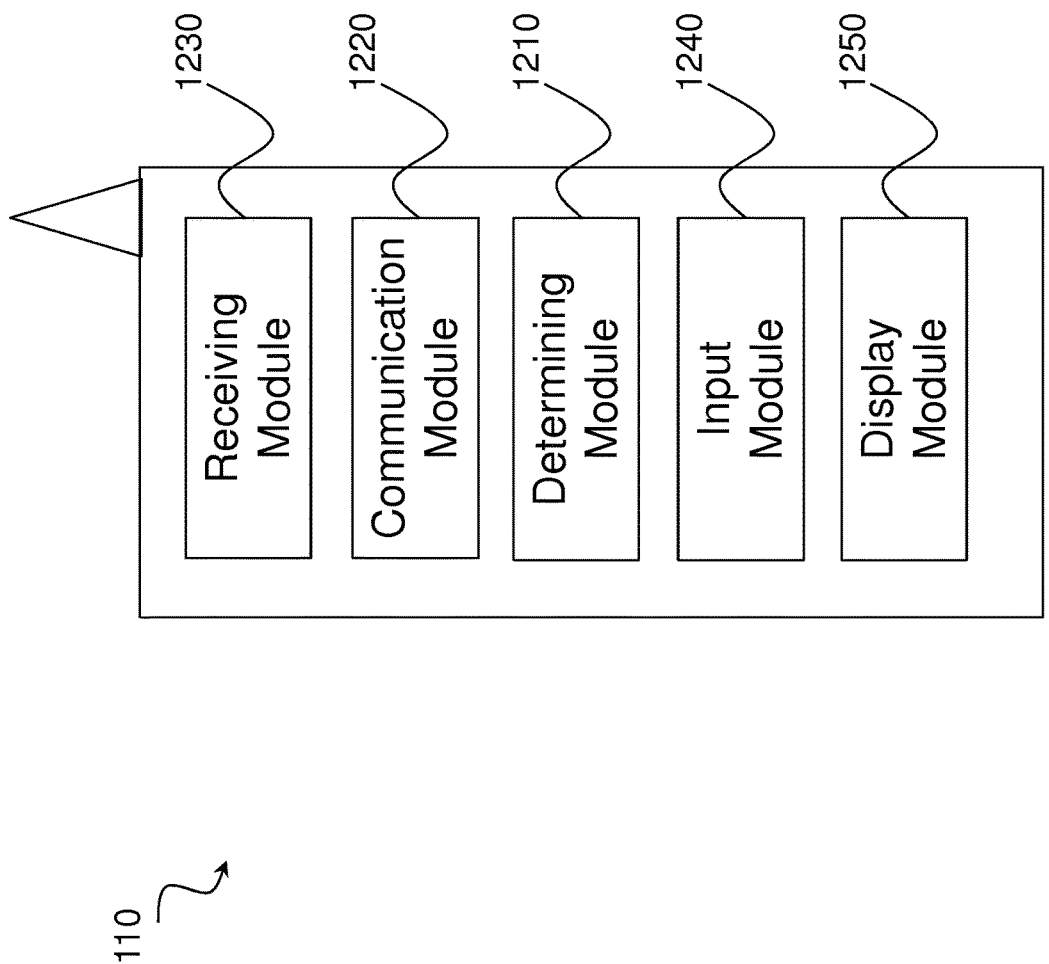
FIG. 12 is a block schematic of an exemplary wireless device, in accordance with certain embodiments.

FIG. 12 is a block schematic of an exemplary wireless device, in accordance with certain embodiments. Wireless device 110 may include one or more modules. For example, wireless device 110 may include a determining module 1210, a communication module 1220, a receiving module 1230, an input module 1240, a display module 1250, and any other suitable modules. Wireless device 110 may perform the methods for adapting SRS switching accounting for measurement procedure described above with respect to FIGS. 1-8.

Determining module 1210 may perform the processing functions of wireless device 110. For example, determining module 1210 may determine that the UE is to perform one or more radio measurements using a first set of reference time resources (R1) on at least a first cell (cell1) operating on a first carrier frequency (F1). As another example, determining module 1210 may adaptively perform SRS carrier-based switching for transmitting SRS on a second cell (cell2) operating on a second carrier frequency (F2) based on the determined first set of reference time resources (R1). As another example, determining module 1210 may use a result of the adaptive SRS carrier-based switching for one or more operational tasks. Determining module 1210 may include or be included in one or more processors, such as processor 920 described above in relation to FIG. 9. Determining module 1210 may include analog and/or digital circuitry configured to perform any of the functions of determining module 1210 and/or processor 920 described above. The functions of determining module 1210 described above may, in certain embodiments, be performed in one or more distinct modules.

Communication module 1220 may perform the transmission functions of wireless device 110. For example, communication module 1220 may signal to another node (e.g., a network node or another UE) a capability related to the UE's ability to adapt SRS switching in order to reduce, minimize, or avoid interruption on critical signals used for performing measurements. Communication module 1220 may transmit messages to one or more of network nodes 115 of network 100. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210. In certain embodiments, the functions of communication module 1220 described above may be performed in one or more distinct modules.

Receiving module 1230 may perform the receiving functions of wireless device 110. Receiving module 1230 may include a receiver and/or a transceiver, such as transceiver 910 described above in relation to FIG. 9. Receiving module 1230 may include circuitry configured to wirelessly receive messages and/or signals. In particular embodiments, receiving module 1230 may communicate received messages and/or signals to determining module 1210.

Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210.

Display module 1250 may present signals on a display of wireless device 110. Display module 1250 may include the display and/or any appropriate circuitry and hardware configured to present signals on the display. Display module 1250 may receive signals to present on the display from determining module 1210.

Determining module 1210, communication module 1220, receiving module 1230, input module 1240, and display module 1250 may include any suitable configuration of hardware and/or software. Wireless device 110 may include additional modules beyond those shown in FIG. 12 that may be responsible for providing any suitable functionality, including any of the functionality described above and/or any additional functionality (including any functionality necessary to support the various solutions described herein).

Figure 13:
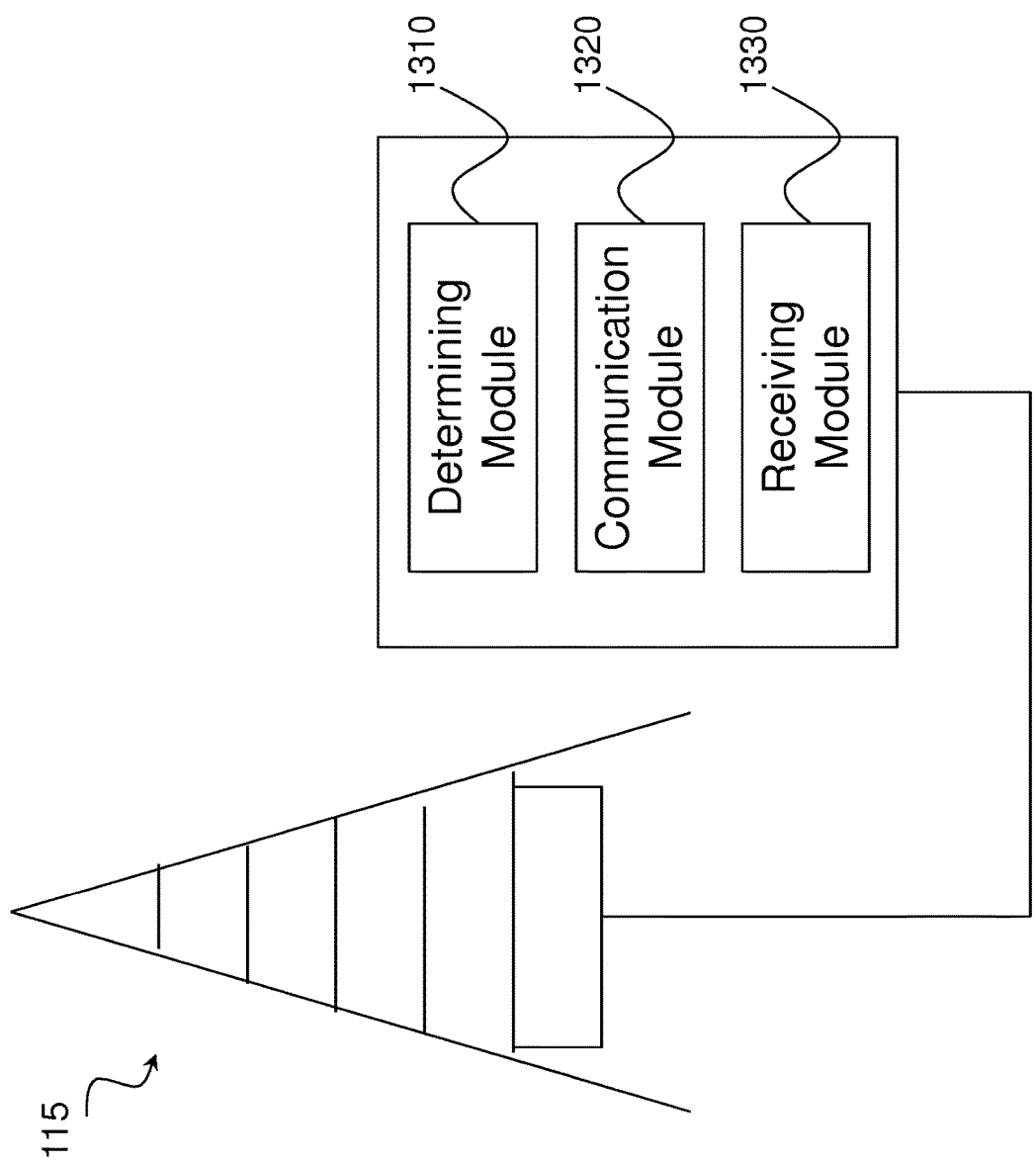
FIG. 13 is a block schematic of an exemplary network node, in accordance with certain embodiments.

FIG. 13 is a block schematic of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processor 1020 described above in relation to FIG. 10. In certain embodiments, the functions of two or more of the various modules may be combined into a single module. Network node 115 may perform the methods for adapting SRS switching accounting for measurement procedure described above with respect to FIGS. 1-8.

Determining module 1310 may perform the processing functions of network node 115. For example, determining module 1310 may determine that a UE is to perform one or more radio measurements using a first set of reference time resources (R1) on at least a first cell (cell1) operating on a first carrier frequency (F1). As another example, determining module 1310 may determine that the UE is to adaptively perform SRS carrier-based switching for transmitting SRS on a second cell (cell2) operating on a second carrier frequency (F2) based on the determined first set of reference time resources (R1). As still another example, determining module 1310 may use a result of the adaptive SRS carrier-based switching for one or more operational tasks. As yet another example, determining module 1310 may obtain a UE's capability related to its ability to adapt SRS carrier based switching to minimize, avoid, or reduce the impact of SRS switching on the UE measurement procedure. As still another example, determining module 1310 may configure the UE to adaptively perform SRS carrier-based switching for transmitting SRS on a second cell (cell2) operating on a second carrier frequency (F2) based on the determined first set of reference time resources (R1). Determining module 1310 may include or be included in one or more processors, such as processor 1020 described above in relation to FIG. 10. Determining module 1310 may include analog and/or digital circuitry configured to perform any of the functions of determining module 1310 and/or processor 1020 described above. The functions of determining module 1310 may, in certain embodiments, be performed in one or more distinct modules. For example, in certain embodiments some of the functionality of determining module 1310 may be performed by an allocation module.

Communication module 1320 may perform the transmission functions of network node 115. For example, communication module 1320 may configure the UE to adaptively perform SRS carrier-based switching for transmitting SRS on a second cell (cell2) operating on a second carrier frequency (F2) based on the determined first set of reference time resources (R1). Communication module 1320 may transmit messages to one or more of wireless devices 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310 or any other module.

Receiving module 1330 may perform the receiving functions of network node 115. For example, receiving module 1330 may obtain a UE's capability related to its ability to adapt SRS carrier based switching to minimize, avoid, or reduce the impact of SRS switching on the UE measurement procedure. Receiving module 1330 may receive any suitable information from a wireless device. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310 or any other suitable module.

Determining module 1310, communication module 1320, and receiving module 1330 may include any suitable configuration of hardware and/or software. Network node 115 may include additional modules beyond those shown in FIG. 13 that may be responsible for providing any suitable functionality, including any of the functionality described above and/or any additional functionality (including any functionality necessary to support the various solutions described herein).

Figure 14:
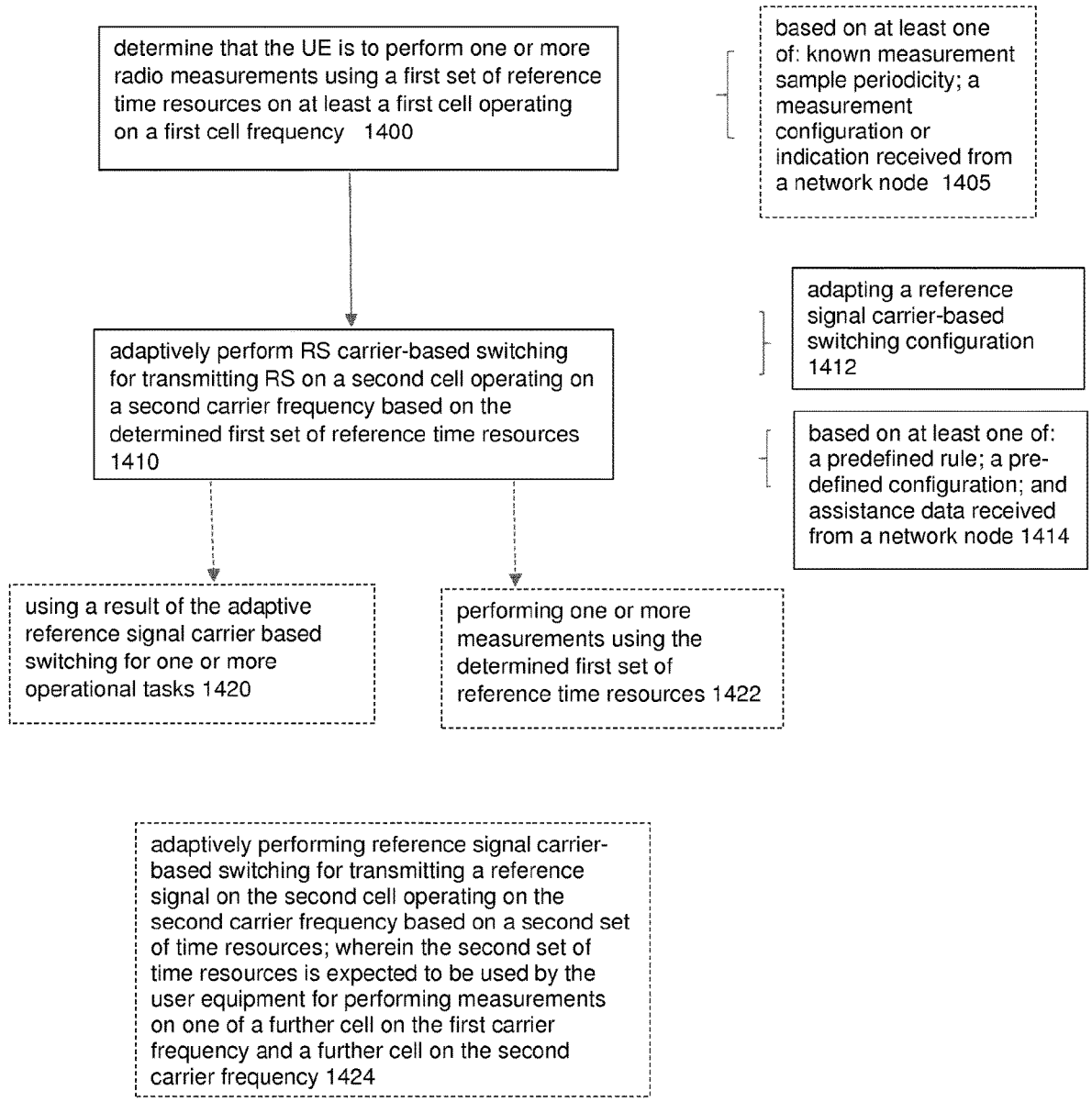
FIG. 14 is a flow diagram of a method in a user equipment, in accordance with certain embodiments.

FIG. 14 is a flow chart showing a method, in a user equipment, for performing one or more radio measurements according to embodiments. The method comprises at 1400 determining that the user equipment is to perform one or more radio measurements using a first set of reference time resources on at least a first cell operating on a first carrier frequency. The method further comprises at 1410 adaptively performing reference signal carrier-based switching for transmitting a reference signal on a second cell operating on a second carrier frequency based on the determined first set of reference time resources. This feature may comprise adaptively performing reference signal carrier-based switching for transmitting a reference signal on a second cell operating on a second carrier frequency based on the determined first set of reference time resources so as to ensure that the first set of reference time resources is available for radio measurement. The first set of reference time resources may comprise at least one of: downlink subframe number 0 or downlink subframe number 5 per radio frame; downlink subframes containing positioning reference signals; downlink subframes containing discovery signals; and at least one downlink subframe and uplink subframe per radio frame for UE Rx-Tx (Receive Transmit) time difference measurement.

Determining 1400 that the user equipment is to perform one or more radio measurements using a first set of reference time resources on at least a first cell operating on a first carrier frequency may comprise 1405 determining that the user equipment is to perform one or more radio measurements using a first set of reference time resources on at least a first cell operating on a first carrier frequency based on at least one of: known measurement sample periodicity; a measurement configuration or indication received from a network node.

Adaptively performing 1410 reference signal carrier-based switching for transmitting a reference signal on a second cell operating on a second carrier frequency based on the determined first set of reference time resources may comprise at 1412 adapting a reference signal carrier-based switching configuration. This may comprise adapting one or more of: a reference signal switching period; a number or set of carriers involved in reference signal carrier based switching; a sequence in which carriers are switched; reference signal switching loop length; one or more reference signal transmission parameters; time-to-stay on carrier during reference signal carrier based switching; minimum or maximum time before reference signal transmission on the second carrier frequency when the user equipment switches to the second carrier frequency; and minimum or maximum time after reference signal transmission on the second carrier frequency when the user equipment switches from the second carrier frequency. As indicated at 1414 the user equipment may adaptively perform said reference signal carrier-based switching based on at least one of: a predefined rule; a pre-defined configuration; and assistance data received from a network node.

The method may further comprise at 1424 adaptively performing reference signal carrier-based switching for transmitting a reference signal on the second cell operating on the second carrier frequency based on a second set of time resources; wherein the second set of time resources is expected to be used by the user equipment for performing measurements on one of a further cell on the first carrier frequency and a further cell on the second carrier frequency.

The method may further comprise at 1422 performing one or more measurements using the determined first set of reference time resources. The method may further comprise at 1420 using a result of the adaptive reference signal carrier based switching for one or more operational tasks.

The reference signal may be a Sounding Reference Signal, SRS. However, the reference signal may be any other type of reference signal, for example a demodulation reference signal, a UE specific reference signal or pilot signal.

The wireless device 110 (which may be referred to as a user equipment) described above with respect to FIGS. 9 and 12 may be configured to perform the method described above with respect to FIG. 14.

According to embodiments, a user equipment comprising one or more processors is provided. The one or more processors are configured to determine that the user equipment is to perform one or more radio measurements using a first set of reference time resources on at least a first cell operating on a first carrier frequency. The one or more processors are further configured to adaptively perform reference signal carrier-based switching for transmitting a reference signal on a second cell operating on a second carrier frequency based on the determined first set of reference time resources.

The one or more processors may be configured to adaptively perform reference signal carrier-based switching for transmitting a reference signal on a second cell operating on a second carrier frequency based on the determined first set of reference time resources so as to ensure that the first set of reference time resources is available for radio measurement.

The first set of reference time resources may comprise at least one of: downlink subframe number 0 or downlink subframe number 5 per radio frame; downlink subframes containing positioning reference signals; downlink subframes containing discovery signals; and at least one downlink subframe and uplink subframe per radio frame for UE Rx-Tx time difference measurement.

The one or more processors may be configured to determine that the user equipment is to perform one or more radio measurements using a first set of reference time resources on at least a first cell operating on a first carrier frequency based on at least one of: known measurement sample periodicity; a measurement configuration or indication received from a network node.

The one or more processors may be configured to adaptively perform reference signal carrier-based switching for transmitting a reference signal on a second cell operating on a second carrier frequency based on the determined first set of reference time resources by adapting a reference signal carrier-based switching configuration. In particular, the one or more processors may be configured to adapt the reference signal carrier-based switching configuration by adapting one or more of: a reference signal switching period; a number or set of carriers involved in reference signal carrier based switching; a sequence in which carriers are switched; reference signal switching loop length; one or more reference signal transmission parameters; time-to-stay on carrier during reference signal carrier based switching; minimum or maximum time before reference signal transmission on the second carrier frequency when the user equipment switches to the second carrier frequency; and minimum or maximum time after reference signal transmission on the second carrier frequency when the user equipment switches from the second carrier frequency.

The one or more processors may be configured to adaptively perform the reference signal carrier-based switching based on at least one of: a predefined rule; a pre-defined configuration; and assistance data received from a network node.

The one or more processors may be further configured to adaptively perform reference signal carrier-based switching for transmitting a reference signal on the second cell operating on the second carrier frequency based on a second set of time resources; wherein the second set of time resources is expected to be used by the user equipment for performing measurements on one of a further cell on the first carrier frequency and a further cell on the second carrier frequency.

The one or more processors may be further configured to perform one or more measurements using the determined first set of reference time resources.

The one or more processors may be further configured to use a result of the adaptive reference signal carrier based switching for one or more operational tasks.

The reference signal may be a Sounding Reference Signal, SRS. However, the reference signal may be any other type of reference signal, for example a demodulation reference signal, a UE specific reference signal or pilot signal.

Figure 15:
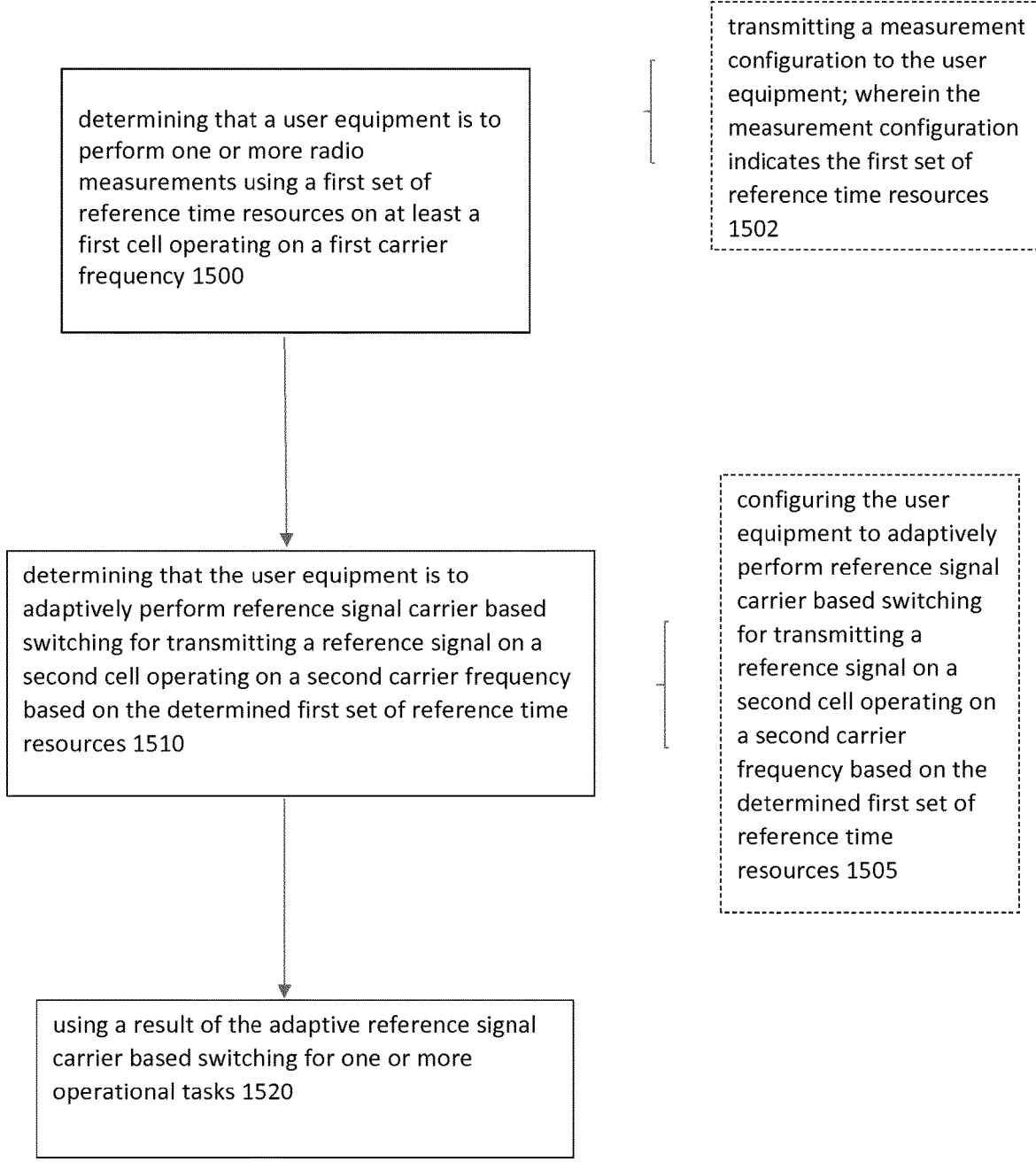
FIG. 15 is a flow diagram of a method in a network node, in accordance with certain embodiments

FIG. 15 is a flow chart showing a method in a network node according to embodiments. The method comprises at 1500 determining that a user equipment is to perform one or more radio measurements using a first set of reference time resources on at least a first cell operating on a first carrier frequency. The network node may at 1502 transmit a measurement configuration to the user equipment; wherein the measurement configuration indicates the first set of reference time resources. The method further comprises at 1510 determining that the user equipment is to adaptively perform reference signal carrier based switching for transmitting a reference signal on a second cell operating on a second carrier frequency based on the determined first set of reference time resources. The method further comprises at 1520 using a result of the adaptive reference signal carrier based switching for one or more operational tasks.

In some embodiments the method may further comprise at 1505 configuring the user equipment to adaptively perform reference signal carrier based switching for transmitting a reference signal on a second cell operating on a second carrier frequency based on the determined first set of reference time resources.

The first set of reference time resources may comprise at least one of: downlink subframe number 0 or downlink subframe number 5 per radio frame; downlink subframes containing positioning reference signals; downlink subframes containing discovery signals; at least one downlink subframe and uplink subframe per radio frame for UE Rx-Tx time difference measurement.

The reference signal may be a Sounding Reference Signal, SRS. However, the reference signal may be any other type of reference signal, for example a demodulation reference signal, a UE specific reference signal or pilot signal.

The network node 115 described above with respect to FIGS. 10 and 13 may be configured to perform the method described with respect to FIG. 15.

According to embodiments a network node comprising one or more processors is provided. The one or more processors are configured to determine that a user equipment is to perform one or more radio measurements using a first set of reference time resources on at least a first cell operating on a first carrier frequency. The one or more processors are further configured to determine that the user equipment is to adaptively perform reference signal carrier based switching for transmitting a reference signal on a second cell operating on a second carrier frequency based on the determined first set of reference time resources. The one or more processors are further configured to use a result of the adaptive reference signal carrier based switching for one or more operational tasks.

The one or more processors may be configured to configure the user equipment to adaptively perform reference signal carrier based switching for transmitting a reference signal on a second cell operating on a second carrier frequency based on the determined first set of reference time resources.

The first set of reference time resources may comprise at least one of: downlink subframe number 0 or downlink subframe number 5 per radio frame; downlink subframes containing positioning reference signals; downlink subframes containing discovery signals; at least one downlink subframe and uplink subframe per radio frame for UE Rx-Tx time difference measurement.

The one or more processors may be configured to transmit a measurement configuration to the user equipment; wherein the measurement configuration indicates the first set of reference time resources.

The reference signal may be a Sounding Reference Signal, SRS. However, the reference signal may be any other type of reference signal, for example a demodulation reference signal, a UE specific reference signal or pilot signal.

Certain embodiments of the present disclosure may provide one or more technical advantages. For example, in certain embodiments the procedures such as DL and/or UL scheduling relying on RS quality may not be affected since UE behavior in terms of adaptive RS carrier-based switching is well defined. As another example, in certain embodiments a UE may be able to perform measurements and meet all the requirements while the UE is performing RS carrier-based switching. As still another example, in certain embodiments UE mobility procedures that depend on RRM measurements may not be degraded due to RS switching. As yet another example, in certain embodiments SI reading quality may advantageously be maintained, even if the UE is performing RS switching. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method, in a user equipment, for performing one or more radio measurements, the method comprising:
    obtaining a configuration for reference signal carrier-based switching, the configuration comprising an indication of when to switch to one or more carriers;
    determining that the user equipment is to perform one or more radio measurements using a first set of reference time resources on at least a first cell operating on a first carrier frequency;
    determining, based on the indication of when to switch to one more carriers in the configuration for reference signal carrier-based switching and the first set of reference time resources, that performing reference signal carrier-based switching according to the obtained configuration will interfere with performing the one or more radio measurements;
    adaptively performing reference signal carrier-based switching for transmitting a reference signal on a second cell operating on a second carrier frequency based on the determined first set of reference time resources so as to ensure that the first set of reference time resources is available for radio measurement; and performing the one or more measurements using the first set of time resources.

2. A method according to claim 1, wherein the first set of reference time resources comprise at least one of: downlink subframe number 0 or downlink subframe number 5 per radio frame; downlink subframes containing positioning reference signals; downlink subframes containing discovery signals; and at least one downlink subframe and uplink subframe per radio frame for UE Rx-Tx time difference measurement.

3. A method according to claim 1, wherein determining that the user equipment is to perform one or more radio measurements using a first set of reference time resources on at least a first cell operating on a first carrier frequency comprises determining that the user equipment is to perform one or more radio measurements using a first set of reference time resources on at least a first cell operating on a first carrier frequency based on at least one of: known measurement sample periodicity; a measurement configuration or indication received from a network node.

4. A method according to claim 1, wherein adaptively performing reference signal carrier-based switching for transmitting a reference signal on a second cell operating on a second carrier frequency based on the determined first set of reference time resources comprises adapting a reference signal carrier-based switching configuration.

5. A method according to claim 4, wherein adapting the reference signal carrier-based switching configuration comprises adapting one or more of: a reference signal switching period; a number or set of carriers involved in reference signal carrier based switching; a sequence in which carriers are switched; reference signal switching loop length; one or more reference signal transmission parameters; time-to-stay on carrier during reference signal carrier based switching; minimum or maximum time before reference signal transmission on the second carrier frequency when the user equipment switches to the second carrier frequency; and minimum or maximum time after reference signal transmission on the second carrier frequency when the user equipment switches from the second carrier frequency.

6. A method according to claim 1, wherein the user equipment adaptively performs said reference signal carrier-based switching based on at least one of: a predefined rule; a pre-defined configuration; and assistance data received from a network node.

7. A method according to claim 1, further comprising adaptively performing reference signal carrier-based switching for transmitting a reference signal on the second cell operating on the second carrier frequency based on a second set of time resources; wherein the second set of time resources is expected to be used by the user equipment for performing measurements on one of a further cell on the first carrier frequency and a further cell on the second carrier frequency.

8. A method, in a network node, comprising:
transmitting a configuration for reference signal carrier-based switching to a user equipment, the configuration comprising an indication of when to switch to one or more carriers;
determining that the user equipment is to perform one or more radio measurements using a first set of reference time resources on at least a first cell operating on a first carrier frequency;

determining, based on the indication of when to switch to one more carriers in the configuration for reference signal carrier-based switching and the first set of reference time resources, that performing reference signal carrier-based switching according to the obtained configuration will interfere with performing the one or more radio measurements;
determining that the user equipment is to adaptively perform reference signal carrier based switching for transmitting a reference signal on a second cell operating on a second carrier frequency based on the determined first set of reference time resources so as to ensure that the first set of reference time resources is available for radio measurement;
receiving the one or more measurements from the user equipment; and
using a result of the adaptive reference signal carrier based switching for one or more operational tasks.

9. A user equipment comprising one or more processors, wherein the one or more processors are configured to:
obtain a configuration for reference signal carrier-based switching, the configuration comprising an indication of when to switch to one or more carriers;
determine that the user equipment is to perform one or more radio measurements using a first set of reference time resources on at least a first cell operating on a first carrier frequency;
determine, based on the indication of when to switch to one more carriers in the configuration for reference signal carrier-based switching and the first set of reference time resources, that performing reference signal carrier-based switching according to the obtained configuration will interfere with performing the one or more radio measurements;
adaptively perform reference signal carrier-based switching for transmitting a reference signal on a second cell operating on a second carrier frequency based on the determined first set of reference time resources, so as to ensure that the first set of reference time resources is available for radio measurement; and
perform the one or more measurements using the first set of time resources.

10. A user equipment according to claim 9, wherein the first set of reference time resources comprise at least one of: downlink subframe number 0 or downlink subframe number 5 per radio frame; downlink subframes containing positioning reference signals; downlink subframes containing discovery signals; and at least one downlink subframe and uplink subframe per radio frame for UE Rx-Tx time difference measurement.

11. A user equipment according to claim 9, wherein the one or more processors are configured to determine that the user equipment is to perform one or more radio measurements using a first set of reference time resources on at least a first cell operating on a first carrier frequency based on at least one of: known measurement sample periodicity; a measurement configuration or indication received from a network node.

12. A user equipment according to claim 9, wherein the one or more processors are configured to adaptively perform reference signal carrier-based switching for transmitting a reference signal on a second cell operating on a second carrier frequency based on the determined first set of reference time resources by adapting a reference signal carrier-based switching configuration.

13. A user equipment according to claim 12, wherein the one or more processors are configured to adapt the reference signal carrier-based switching configuration by adapting one or more of: a reference signal switching period; a number or set of carriers involved in reference signal carrier based switching; a sequence in which carriers are switched; reference signal switching loop length; one or more reference signal transmission parameters; time-to-stay on carrier during reference signal carrier based switching; minimum or maximum time before reference signal transmission on the second carrier frequency when the user equipment switches to the second carrier frequency; and minimum or maximum time after reference signal transmission on the second carrier frequency when the user equipment switches from the second carrier frequency.

14. A user equipment according to claim 9, wherein the one or more processors are configured to adaptively perform the reference signal carrier-based switching based on at least one of: a predefined rule; a pre-defined configuration; and assistance data received from a network node.

15. A user equipment according to claim 9, wherein the one or more processors are further configured to adaptively perform reference signal carrier-based switching for transmitting a reference signal on the second cell operating on the second carrier frequency based on a second set of time resources; wherein the second set of time resources is expected to be used by the user equipment for performing measurements on one of a further cell on the first carrier frequency and a further cell on the second carrier frequency.

16. A user equipment according to claim 9, wherein the one or more processors are further configured to use a result of the adaptive reference signal carrier based switching for one or more operational tasks.

17. A user equipment according to claim 9, wherein the reference signal is a Sounding Reference Signal, SRS.

18. A network node comprising one or more processors, wherein the one or more processors are configured to:
   transmitting a configuration for reference signal carrier-based switching to a user equipment, the configuration comprising an indication of when to switch to one or more carriers;
   determine that the user equipment is to perform one or more radio measurements using a first set of reference time resources on at least a first cell operating on a first carrier frequency;
   determine, based on the indication of when to switch to one more carriers in the configuration for reference signal carrier-based switching and the first set of reference time resources, that performing reference signal carrier-based switching according to the obtained configuration will interfere with performing the one or more radio measurements;
   determine that the user equipment is to adaptively perform reference signal carrier based switching for transmitting a reference signal on a second cell operating on a second carrier frequency based on the determined first set of reference time resources so as to ensure that the first set of reference time resources is available for radio measurement;
   receive the one or more measurements from the user equipment; and
   use a result of the adaptive reference signal carrier based switching for one or more operational tasks.

19. A network node according to claim 18, wherein the one or more processors are configured to configure the user equipment to adaptively perform reference signal carrier based switching for transmitting a reference signal on a second cell operating on a second carrier frequency based on the determined first set of reference time resources.

20. A network node according to claim 18, wherein the first set of reference time resources comprise at least one of: downlink subframe number 0 or downlink subframe number 5 per radio frame; downlink subframes containing positioning reference signals; downlink subframes containing discovery signals; at least one downlink subframe and uplink subframe per radio frame for UE Rx-Tx time difference measurement.

21. A network node according to claim 18, wherein the reference signal is a Sounding Reference Signal, SRS.

\* \* \* \* \*

UNITED STATES PATENT AND TRADEMARK OFFICE
CERTIFICATE OF CORRECTION

PATENT NO. : 11,239,930 B2
APPLICATION NO. : 16/340334
DATED : February 1, 2022
INVENTOR(S) : Kazmi et al.

It is certified that error appears in the above-identified patent and that said Letters Patent is hereby corrected as shown below:

In the Claims

In Column 38, Line 59, in Claim 1, delete "one more" and insert -- one or more --, therefor.

In Column 40, Line 2, in Claim 8, delete "one more" and insert -- one or more --, therefor.

In Column 40, Line 29, in Claim 9, delete "one more" and insert -- one or more --, therefor.

In Column 42, Line 6, in Claim 18, delete "one more" and insert -- one or more --, therefor.

Signed and Sealed this
Sixteenth Day of August, 2022

Katherine Kelly Vidal
*Director of the United States Patent and Trademark Office*